(12) United States Patent
Yoshizumi et al.

(10) Patent No.: US 8,275,171 B2
(45) Date of Patent: Sep. 25, 2012

(54) COMPOSITION DETERMINING APPARATUS, COMPOSITION DETERMINING METHOD, AND PROGRAM

(75) Inventors: Shingo Yoshizumi, Tokyo (JP); Hiroki Yamawaki, Kanagawa (JP)

(73) Assignee: Sony Corporation (JP)

( * ) Notice: Subject to any disclaimer, the term of this patent is extended or adjusted under 35 U.S.C. 154(b) by 969 days.

(21) Appl. No.: 12/287,179

(22) Filed: Oct. 7, 2008

(65) Prior Publication Data

US 2009/0103778 A1 Apr. 23, 2009

(30) Foreign Application Priority Data

Oct. 17, 2007 (JP) ................. P2007-270391

(51) Int. Cl.
*G06K 9/00* (2006.01)
*G01C 3/08* (2006.01)
(52) U.S. Cl. ........ 382/103; 382/106; 382/118; 356/4.01
(58) Field of Classification Search ................. None
See application file for complete search history.

(56) References Cited

U.S. PATENT DOCUMENTS

| | | | |
|---|---|---|---|
| 6,661,450 B2 | 12/2003 | Yata | |
| 2005/0168779 A1 | 8/2005 | Tsue et al. | |
| 2007/0110422 A1* | 5/2007 | Minato et al. | 396/89 |
| 2008/0159628 A1 | 7/2008 | Yoshida | |

FOREIGN PATENT DOCUMENTS

| | | | |
|---|---|---|---|
| JP | 59-208983 A | 11/1984 | |
| JP | 2001-268425 A | 9/2001 | |
| JP | 2003-107335 A | 4/2003 | |
| JP | 2005094406 A | 4/2005 | |
| JP | 2005110160 A | 4/2005 | |
| JP | 2006279252 A | 10/2006 | |
| JP | 2007006165 A | 1/2007 | |
| JP | 2007006325 A | 1/2007 | |
| JP | 2007228224 A | 9/2007 | |
| JP | 2007235399 A | 9/2007 | |
| JP | 2007251724 A | 9/2007 | |
| JP | 2007267177 A | 10/2007 | |

OTHER PUBLICATIONS

Office Action from Japanese Application No. 2007-270391, dated Aug. 30, 2011.
European Search Report EP 08166789, dated Dec. 30, 2011.
Office Action from Japanese Application 2007-270391 dated Jun. 10, 2012.

* cited by examiner

*Primary Examiner* — Vu Le
*Assistant Examiner* — Kenny Cese
(74) *Attorney, Agent, or Firm* — Lerner, David, Littenberg, Krumholz & Mentlik, LLP

(57) ABSTRACT

A composition determining apparatus includes a subject detecting unit configured to detect one or more specific subjects in an image based on image data; a subject orientation detecting unit configured to detect subject orientation information indicating an orientation in the image of the subject detected by the subject detecting unit, the detection of the subject orientation information being performed for each of the detected subjects; and a composition determining unit configured to determine a composition based on the subject orientation information. When a plurality of subjects are detected by the subject detecting unit, the composition determining unit determines a composition based on a relationship among a plurality of pieces of the subject orientation information corresponding to the plurality of subjects.

9 Claims, 21 Drawing Sheets

FIG. 6A
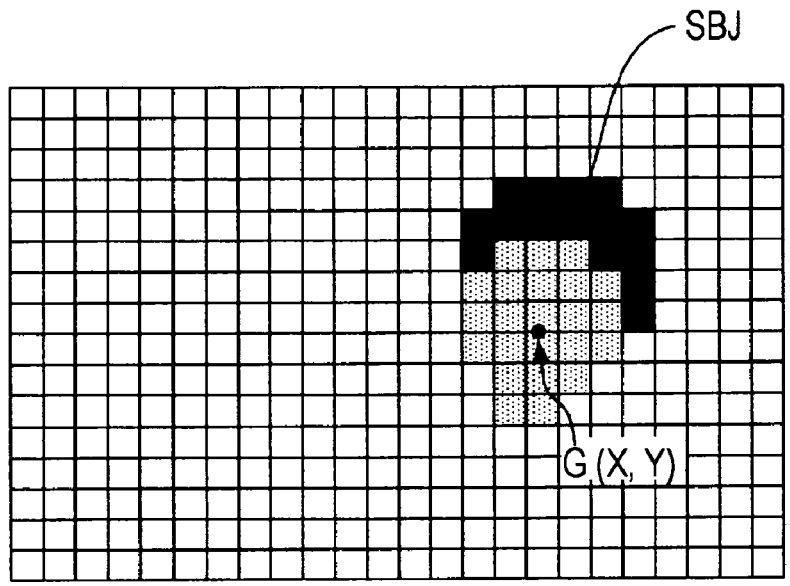
FIG. 6B
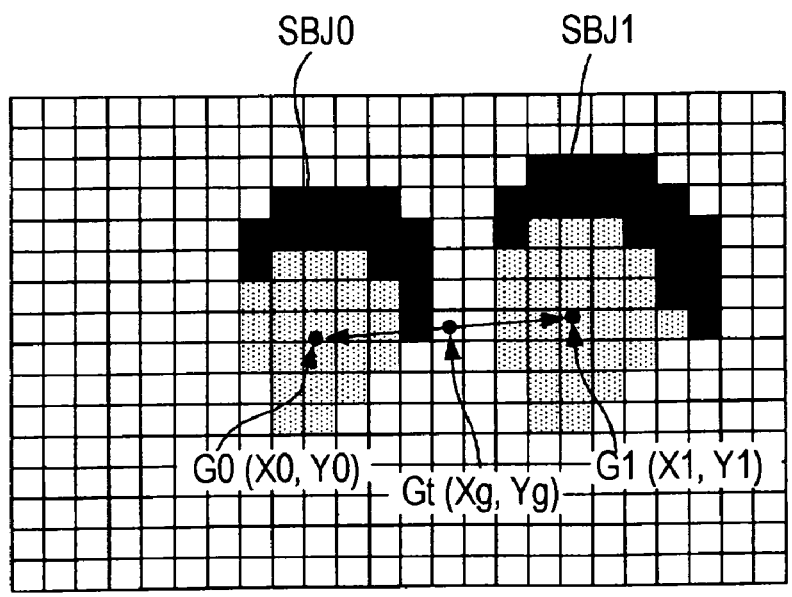

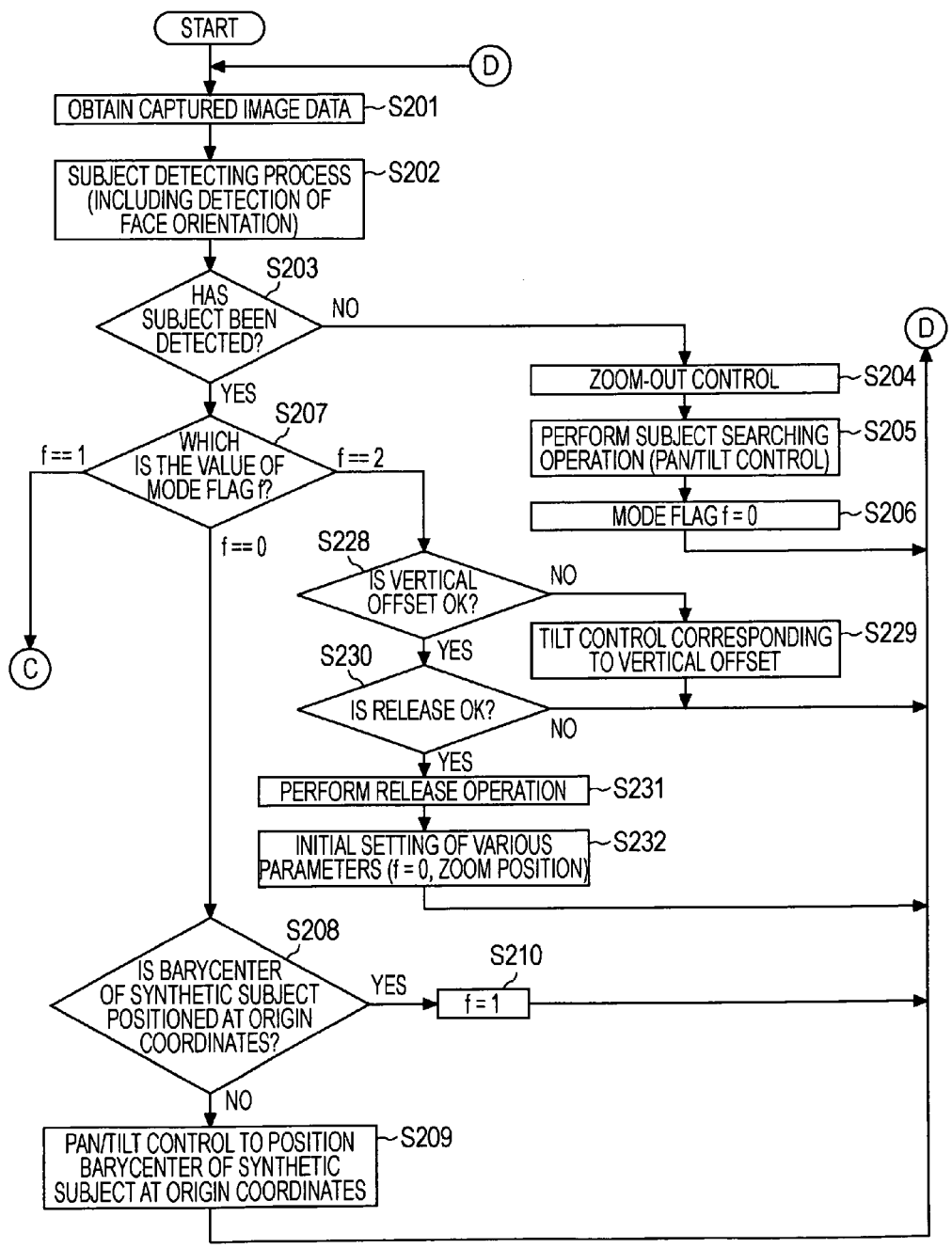

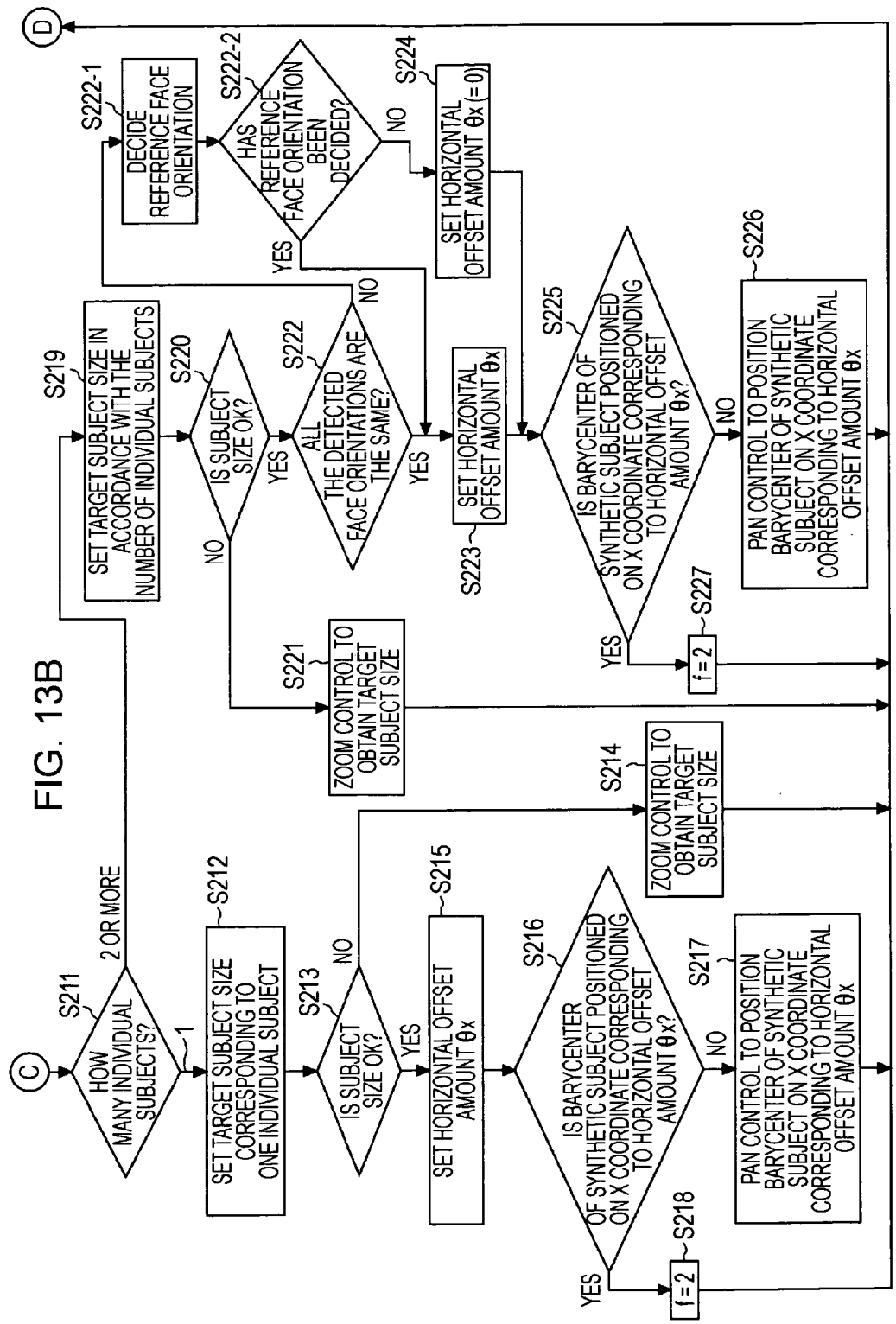

COMPOSITION DETERMINING APPARATUS, COMPOSITION DETERMINING METHOD, AND PROGRAM

CROSS REFERENCES TO RELATED APPLICATIONS

The present application claims priority from Japanese Patent Application JP No. 2007-270391 filed in the Japanese Patent Office on Oct. 17, 2007, the entire content of which is incorporated herein by reference.

BACKGROUND OF THE INVENTION

1. Field of the Invention

The present invention relates to a composition determining apparatus to perform a process about a composition of image content on still image data or the like and to a composition determining method. Also, the present invention relates to a program executed by the apparatus.

2. Description of the Related Art

One of technical factors for taking a photo giving a good impression is composition setting. The term "composition" here is also called "framing" and is layout of a subject in an image as a photo or the like.

There are some typical and basic methods for obtaining a good composition. However, it is far from easy for an ordinary camera user to take a photo of a good composition unless he/she has sufficient knowledge and technique about photography. For this reason, a technical configuration enabling a user to readily and easily obtain a photo image of a good composition is demanded.

For example, Patent Document 1 (Japanese Unexamined Patent Application Publication No. 59-208983) discloses a technical configuration of an automatic tracking apparatus. In this technical configuration, a difference between images of a regular time interval is detected, a barycenter of the difference between the images is calculated, an imaging apparatus is controlled by detecting the amount and direction of movement of a subject image with respect to an imaging screen based on the amount and direction of movement of the barycenter, and the subject image is set in a reference area of the imaging screen.

Also, Patent Document 2 (Japanese Unexamined Patent Application Publication No. 2001-268425) discloses a technique about an automatic tracking apparatus. In this technique, a person is automatically tracked with the area of upper 20% of the entire person on a screen being at the center of the screen so that the face of the person is positioned at the center of the screen, whereby the person can be tracked while his/her face being reliably shot.

When those technical configurations are viewed from a viewpoint of deciding a composition, it is possible to automatically search for a subject as a person and place the subject in an imaging screen with a predetermined composition.

SUMMARY OF THE INVENTION

An optimum composition may vary depending on a predetermined status or condition of a subject. However, the techniques disclosed in the above-mentioned Patent Documents can only place a tracked subject with a certain fixed composition. In other words, it may be impossible to perform shooting by changing a composition in accordance with the status of a subject.

Accordingly, the present invention is directed to suggesting a technique for easily obtaining a good composition of an image as a photo or the like. Specifically, the present invention is directed to deciding a composition more appropriately and flexibly in accordance with a change in status and condition of a subject.

According to an embodiment of the present invention, there is provided a composition determining apparatus including subject detecting means for detecting one or more specific subjects in an image based on image data; subject orientation detecting means for detecting subject orientation information indicating an orientation in the image of the subject detected by the subject detecting means, the detection of the subject orientation information being performed for each of the detected subjects; and composition determining means for determining a composition based on the subject orientation information. When a plurality of subjects are detected by the subject detecting means, the composition determining means determines a composition based on a relationship among a plurality of pieces of the subject orientation information corresponding to the plurality of subjects.

In the above-described configuration, an orientation of a predetermined portion of a subject detected in a screen of image data can be detected, and subject orientation information indicating the detected orientation can be obtained.

If a plurality of subjects are detected, a composition is determined based on a relationship among orientations indicated by a plurality of pieces of subject orientation information corresponding to the plurality of detected subjects.

For example, an optimum composition may vary depending on the orientation of each subject. According to the embodiment of the present invention, when a plurality of subjects exist, an optimum composition can be obtained in accordance with the relationship among the orientations of those subjects.

When a plurality of subjects exist, a certain relationship occurs among the orientations of the respective subjects. In the embodiment of the present invention, a composition is decided based on a condition that is complicated to some extent, such as the relationship among the orientations of a plurality of subjects. That is, a composition can be automatically decided more appropriately and flexibly than before. Accordingly, a user using an apparatus to which the embodiment of the present invention is applied can obtain an image of an optimum composition without a cumbersome operation, so that increased convenience can be provided.

BRIEF DESCRIPTION OF THE DRAWINGS

FIGS. 6A and 6B are diagrams illustrating a barycenter of an individual subject and a barycenter of a synthetic subject composed of a plurality of individual subjects;

FIGS. 13A and 13B illustrate a flowchart of an example of a process procedure for the second composition control;

DESCRIPTION OF THE PREFERRED EMBODIMENTS

Hereinafter, an embodiment of the present invention is described. Specifically, descriptions are given about a case where a configuration based on the embodiment of the present invention is applied to an imaging system including a digital still camera and a pan/tilt head to which the digital still camera is attached.

Figure 1:
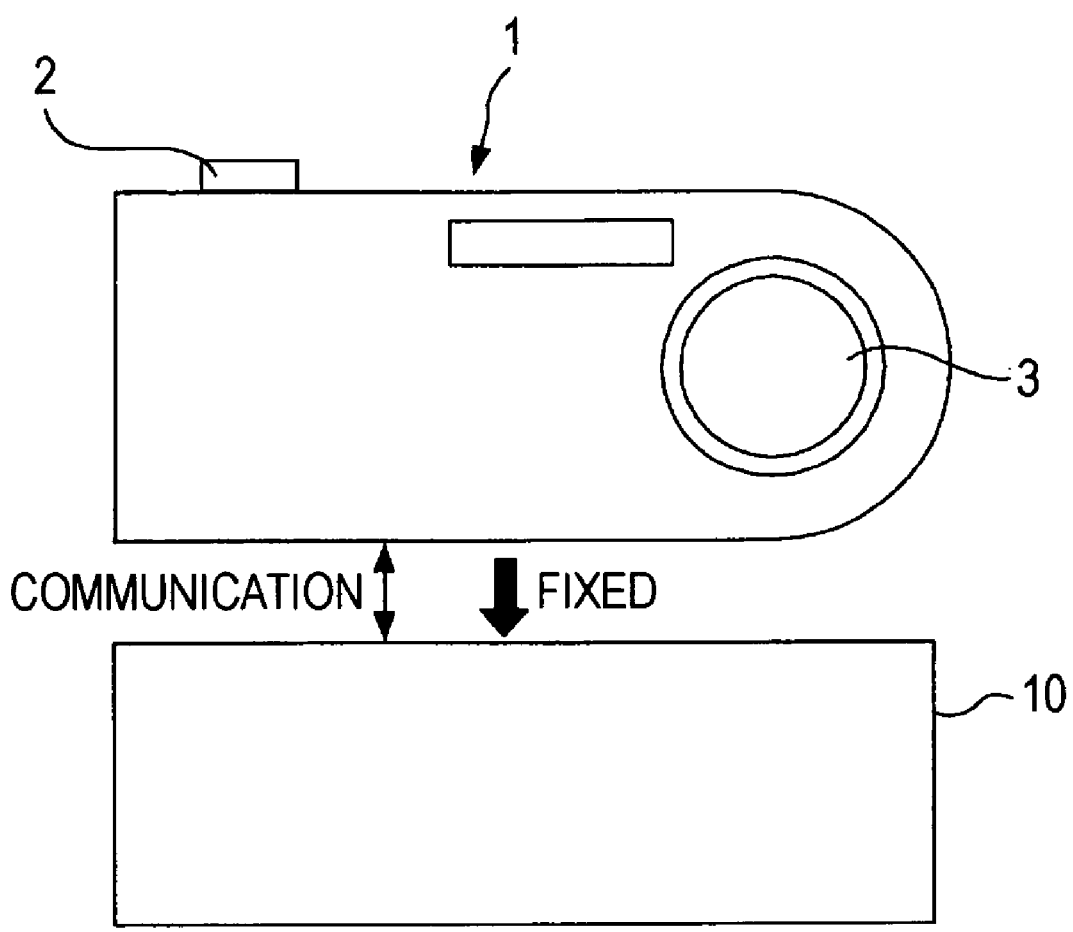
FIG. 1 is a diagram illustrating an example of an appearance configuration of an imaging system including a digital still camera and a pan/tilt head according to an embodiment of the present invention.

FIG. 1 is a front view illustrating an example of an appearance configuration of an imaging system according to the embodiment.

As illustrated in FIG. 1, the imaging system of the embodiment includes a digital still camera 1 and a pan/tilt head 10.

The digital still camera 1 is capable of generating still image data based on imaging light obtained through a lens unit 3 provided on a front-side panel of a main body and storing the still image data in a storage medium loaded therein. That is, the digital still camera 1 has a function of storing images captured as photos in a storage medium in the form of still image data. When such photography is manually performed, a user presses a shutter (release) button 2 provided on an upper surface of the main body.

The digital still camera 1 can be attached to the pan/tilt head 10 by fixing it. That is, the pan/tilt head 10 and the digital still camera 1 have a mechanism portion enabling mutual attachment.

The pan/tilt head 10 has a pan/tilt mechanism to move the digital still camera 1 attached thereto in both pan (horizontal) and tilt directions.

Figure 2A:
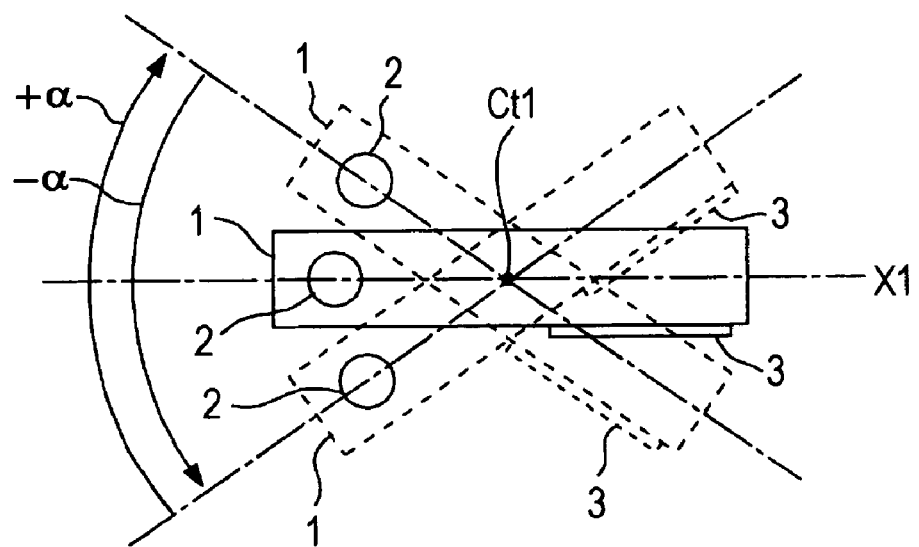
FIGS. 2A and 2B are diagrams schematically illustrating movements of the imaging system according to the embodiment, that is, an example of movements along pan and tilt directions of the digital still camera attached to the pan/tilt head.
Figure 2B:
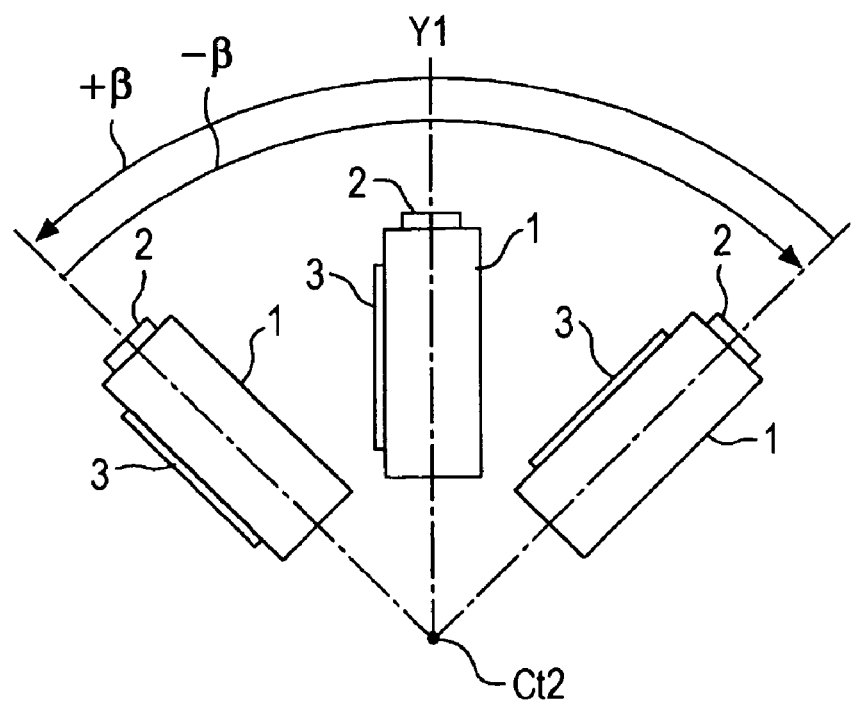

Examples of movement in the pan and tilt directions of the digital still camera 1 realized by the pan/tilt mechanism of the pan/tilt head 10 are illustrated in FIGS. 2A and 2B. FIGS. 2A and 2B illustrate the digital still camera 1 attached to the pan/tilt head 10 viewed in a planar direction and a side direction, respectively.

Regarding the pan direction, a positional state where the horizontal direction of the main body of the digital still camera 1 matches a straight line X1 in FIG. 2A is regarded as a reference state. For example, when rotation along a rotational direction $+\alpha$ around a rotational axis Ct1 is performed, a panning movement to the right is given. When rotation along a rotational direction $-\alpha$ is performed, a panning movement to the left is given.

On the other hand, regarding the tilt direction, a positional state where the vertical direction of the main body of the digital still camera 1 matches a straight line Y1 in FIG. 2B is regarded as a reference state. For example, when rotation along a rotational direction $+\beta$ around a rotational axis Ct2 is performed, a downward tiling movement is given. When rotation along a rotational direction $-\beta$ is performed, an upward tilting movement is given.

Maximum movable rotation angles in the respective $\pm\alpha$ and $\pm\beta$ directions illustrated in FIGS. 2A and 2B are not referred to. However, it is preferable that the maximum movable rotation angles are as large as possible so that a user can have more opportunities to catch subjects.

Figure 3:
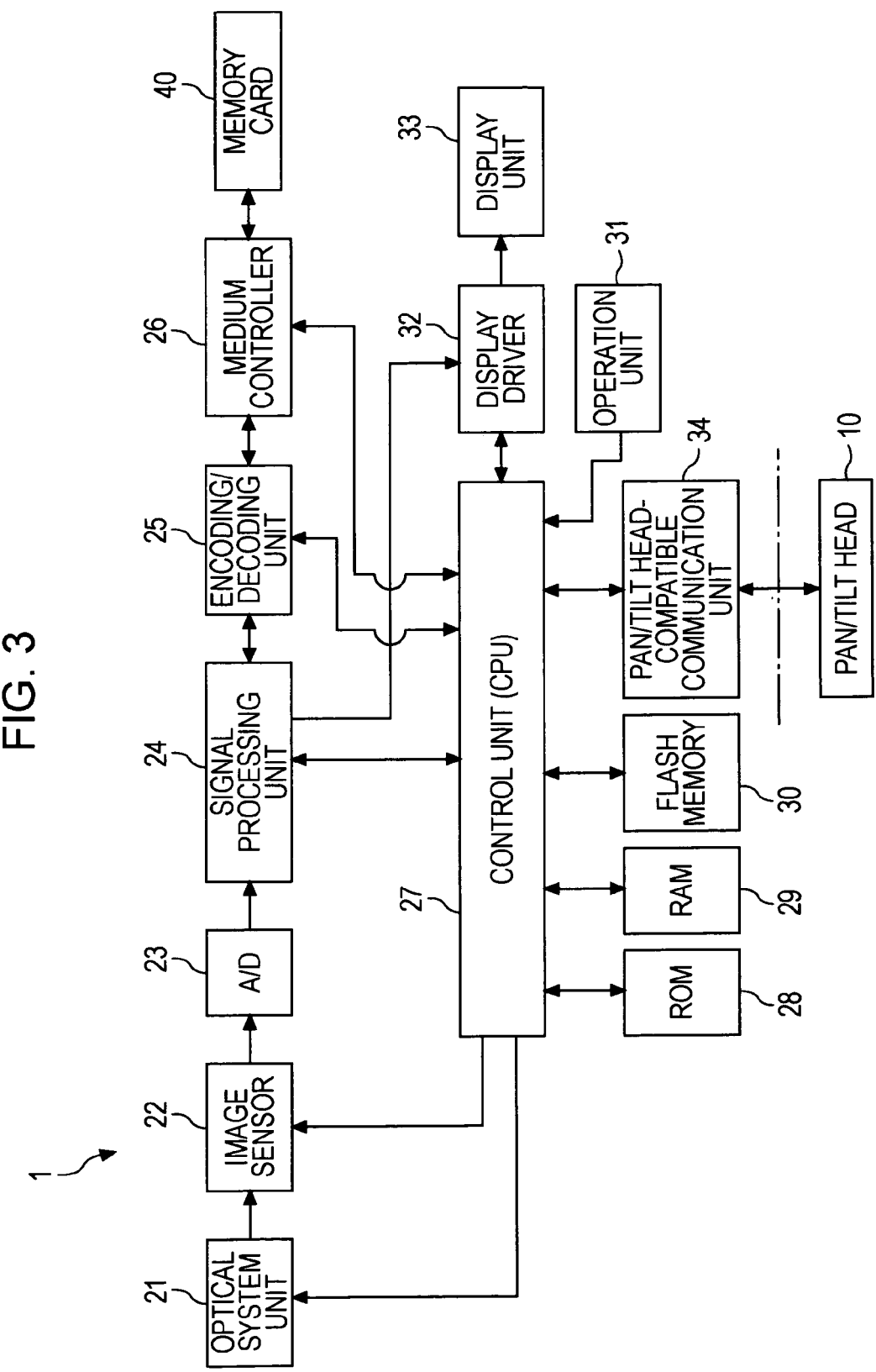
FIG. 3 is a diagram illustrating an example of a configuration of the digital still camera according to the embodiment.

FIG. 3 is a block diagram illustrating an example of an internal configuration of the digital still camera 1 according to the embodiment.

Referring to FIG. 3, an optical system unit 21 includes a group of a predetermined number of imaging lenses, such as a zoom lens and a focus lens; and an aperture. The optical system unit 21 forms an image on a light-receiving surface of an image sensor 22 based on incident light as imaging light.

Also, the optical system unit 21 includes driving mechanisms to drive the zoom lens, focus lens, aperture, and so on. The operations of those driving mechanisms are controlled by so-called camera control, such as zoom (angle of view) control, autofocus control, and autoexposure control, performed by a control unit 27, for example.

The image sensor 22 performs so-called photoelectric conversion of converting imaging light obtained in the optical system unit 21 to electric signals. For this purpose, the image sensor 22 receives, on the light-receiving surface of a photoelectric conversion device, imaging light from the optical system unit 21, and sequentially outputs signal charges accumulated in accordance with the intensity of the received light at predetermined timing. Accordingly, electric signals (imaging signals) corresponding to the imaging light are output. The photoelectric conversion device (imaging device) adopted as the image sensor 22 is not particularly limited. Under present circumstances, a CMOS (complementary metal-oxide semiconductor) sensor or a CCD (charge coupled device) can be used, for example. When the CMOS sensor is adopted, the configuration of a device (component) corresponding to the image sensor 22 may include an analog-digital converter corresponding to an A/D converter 23 described below.

The imaging signals output from the image sensor 22 are input to the A/D converter 23 and are converted to digital signals, and then the digital signals are input to a signal processing unit 24.

The signal processing unit 24 takes in the digital imaging signals output from the A/D converter 23 in units of still images (frame images), for example, and performs necessary signal processing on the imaging signals in units of still images, thereby generating captured image data (captured still image data), which is image signal data corresponding to one still image.

When the captured image data generated by the signal processing unit 24 in the above-described manner is to be stored as image information in a memory card 40 serving as a storage medium (storage medium device), the captured image data corresponding to one still image is output from the signal processing unit 24 to an encoding/decoding unit 25.

The encoding/decoding unit 25 performs compression coding in a predetermined still image compression coding method on the captured image data of the still image output from the signal processing unit 24 and adds a header or the like in accordance with control by the control unit 27, thereby converting the captured image data to captured image data compressed in a predetermined format. Then, the encoding/decoding unit 25 transfers the captured image data generated in this manner to a medium controller 26. The medium controller 26 writes the transferred captured image data on the memory card 40 in accordance with control by the control unit 27, so that the captured image data is stored in the memory card 40.

The memory card 40 adopted in this case is a storage medium that has an outer shape of a card compliant with a predetermined standard and that includes a nonvolatile semiconductor storage device, such as a flash memory. Instead of the memory card 40, another type and format of storage medium may be used to store image data.

The signal processing unit 24 according to the embodiment is capable of performing image processing to detect a subject by using the captured image data obtained in the above-described manner. Details of a subject detecting process in the embodiment are described below.

Also, the digital still camera 1 is capable of displaying a so-called through image, which is an image that is currently being captured, by allowing a display unit 33 to perform image display by using the captured image data obtained in the signal processing unit 24. Specifically, the signal processing unit 24 takes in imaging signals output from the A/D converter 23 and generates captured image data corresponding to one still image, as described above. By continuing this operation, the signal processing unit 24 sequentially generates captured image data corresponding to frame images in moving images. Then, the signal processing unit 24 transfers the sequentially generated captured image data to a display driver 32 in accordance with control by the control unit 27. Accordingly, through images are displayed.

The display driver 32 generates a drive signal to drive the display unit 33 based on the captured image data input from the signal processing unit 24 in the above-described manner and outputs the drive signal to the display unit 33. Accordingly, images based on the captured image data in units of still images are sequentially displayed in the display unit 33, whereby the user can view moving images that are being captured at the time in the display unit 33. That is, monitor images are displayed.

Also, the digital still camera 1 is capable of reproducing the captured image data recorded on the memory card 40 and displaying the images in the display unit 33.

For this purpose, the control unit 27 specifies captured image data and instructs the medium controller 26 to read the data from the memory card 40. In response to the instructions, the medium controller 26 accesses an address on the memory card 40 on which the specified captured image data is recorded and reads the data, and then transfers the read data to the encoding/decoding unit 25.

The encoding/decoding unit 25 extracts substantial data as compressed still image data from the captured image data transferred from the medium controller 26 in accordance with control by the control unit 27 and performs a decoding process corresponding to compression coding on the compressed still image data, thereby obtaining captured image data corresponding to one still image. Then, the encoding/decoding unit 25 transfers the captured image data to the display driver 32. Accordingly, the image of the captured image data recorded on the memory card 40 is reproduced and displayed in the display unit 33.

Together with the above-described monitor image and reproduced image of captured image data, a user interface image can be displayed in the display unit 33. In that case, the control unit 27 generates image data to be displayed as a necessary user interface image in accordance with the operation state at the time and outputs the generated image data to the display driver 32. Accordingly, the user interface image is displayed in the display unit 33. This user interface image can be displayed as a specific menu screen or the like on a display screen of the display unit 33 separately from the monitor image or the reproduced image of captured image data. Alternatively, the user interface image can be displayed while being superimposed on or combined into part of the monitor image or the reproduced image of captured image data.

The control unit 27 actually includes a CPU (central processing unit) and constitutes a microcomputer together with a ROM (read only memory) 28 and a RAM (random access memory) 29. The ROM 28 stores a program to be executed by the CPU as the control unit 27, various pieces of setting information related to the operation of the digital still camera 1, and so on. The RAM 29 serves as a main storage device for the CPU.

In this case, a flash memory 30 is provided as a nonvolatile storage area used to store various pieces of setting information that should be changed (rewritten) in accordance with a user operation or an operation history. When a nonvolatile memory, such as a flash memory, is adopted as the ROM 28, part of a storage area in the ROM 28 may be used instead of the flash memory 30.

An operation unit 31 includes various operation buttons provided in the digital still camera 1 and an operation information signal outputting unit to generate operation information signals corresponding to operations performed on those operation buttons and output the generated signals to the CPU. The control unit 27 performs a predetermined process in response to each of the operation information signals input from the operation unit 31. Accordingly, the digital still camera 1 is operated in accordance with a user operation.

A pan/tilt head-compatible communication unit 34 performs communication between the pan/tilt head 10 and the digital still camera 1 in accordance with a predetermined communication method, and has a physical layer configuration enabling wired or wireless transmission/reception of communication signals to/from a communication unit of the pan/tilt head 10 in a state where the digital still camera 1 is attached to the pan/tilt head 10; and a configuration to realize a communication process corresponding to a predetermined upper layer.

Figure 4:
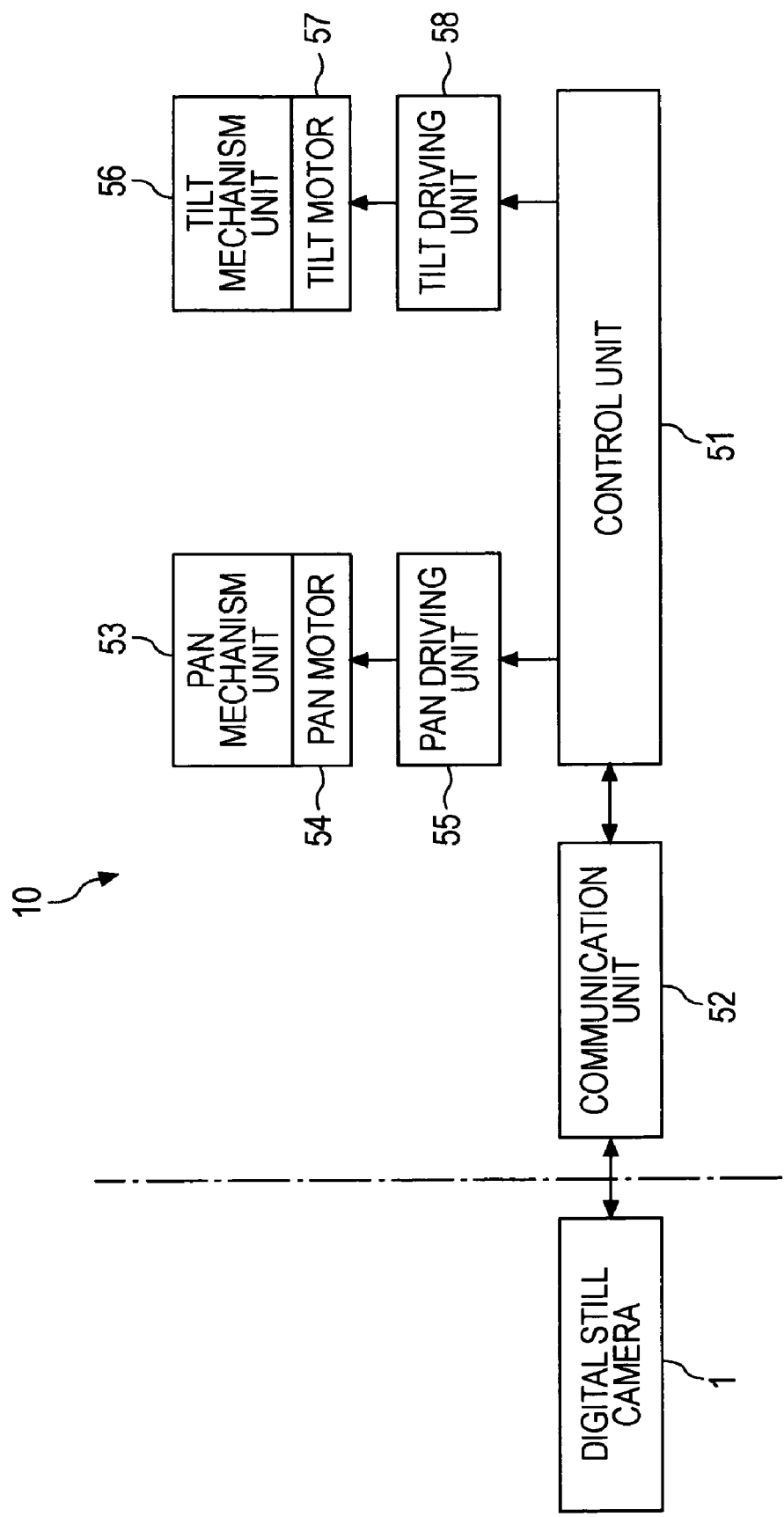
FIG. 4 is a diagram illustrating an example of a configuration of the pan/tilt head according to the embodiment.

FIG. 4 is a block diagram illustrating an example of a configuration of the pan/tilt head 10.

As described above, the pan/tilt head 10 includes a pan/tilt mechanism. As elements corresponding to this mechanism, the pan/tilt head 10 includes a pan mechanism unit 53, a pan motor 54, a tilt mechanism unit 56, and a tilt motor 57.

The pan mechanism unit 53 has a mechanism to give a movement in the pan (horizontal) direction illustrated in FIG. 2A to the digital still camera 1 attached to the pan/tilt head 10, and the movement of this mechanism can be obtained when the pan motor 54 rotates in a forward or reverse direction. Likewise, the tilt mechanism unit 56 has a mechanism to give a movement in the tilt (vertical) direction illustrated in FIG. 2B to the digital still camera 1 attached to the pan/tilt head 10, and the movement of this mechanism can be obtained when the tilt motor 57 rotates in a forward or reverse direction.

A control unit 51 includes a microcomputer formed by combining a CPU, a ROM, and a RAM, for example, and controls the movement of the pan mechanism unit 53 and the tilt mechanism unit 56. Specifically, when controlling the movement of the pan mechanism unit 53, the control unit 51 outputs a control signal corresponding to the amount and direction of movement necessary for the pan mechanism unit 53 to the pan driving unit 55. The pan driving unit 55 generates a motor driving signal corresponding to the input control signal and outputs the motor driving signal to the pan motor 54. The pan motor 54 is rotated by the motor driving signal in a necessary rotational direction and at a necessary rotation angle. As a result, the pan mechanism unit 53 is driven to move by the corresponding movement amount in the corresponding movement direction.

Likewise, when controlling the movement of the tilt mechanism unit 56, the control unit 51 outputs a control signal corresponding to the amount and direction of movement necessary for the tilt mechanism unit 56 to the tilt driving unit 58. The tilt driving unit 58 generates a motor driving signal corresponding to the input control signal and outputs the motor driving signal to the tilt motor 57. The tilt motor 57 is rotated by the motor driving signal in a necessary rotational direction and at a necessary rotation angle. As a result, the tilt mechanism unit 56 is driven to move by the corresponding movement amount in the corresponding movement direction.

A communication unit 52 communicates with the pan/tilt head-compatible communication unit 34 in the digital still camera 1 attached to the pan/tilt head 10 in accordance with a predetermined communication method. As the pan/tilt head-compatible communication unit 34, the communication unit 52 includes a physical layer configuration enabling wired or wireless transmission/reception of communication signals to/from the communication unit on the other side; and a configuration to realize a communication process corresponding to a predetermined upper layer.

In the imaging system including the digital still camera 1 and the pan/tilt head 10 having the above-described configuration, if a person is regarded as a main subject (hereinafter referred to simply as a subject) and if the existence of the subject is detected after search, the pan/tilt mechanism of the pan/tilt head 10 is driven to obtain an optimum composition of an image including the subject (to perform optimum framing). Then, at the timing when the optimum composition is obtained, the image data captured at the time is recorded on the storage medium (memory card 40).

That is, in the imaging system according to the embodiment, an operation of deciding (determining) an optimum composition for a found subject and performing shooting and recording is automatically performed during photography by the digital still camera 1. In this way, a photo image of a moderately good quality can be obtained without necessity of composition determination and shooting by a user. Furthermore, in such a system, shooting can be performed without someone's holding the camera, and thus everyone in the shooting site can become a subject. In addition, even if a user as a subject does not consciously enter a view-angle range of the camera, the subject can be taken in a photo. That is, opportunities to shoot a natural appearance of people existing in a shooting site increase, and thus many photos having an unprecedented atmosphere can be obtained.

An optimum composition may vary depending on the orientation of a subject. However, according to the embodiment, different optimum compositions are decided in accordance with the relationship among orientations of a plurality of subjects. Accordingly, a user using an apparatus having the configuration according to the embodiment can obtain an image of an optimum composition without a cumbersome operation.

Hereinafter, composition control according to the embodiment is described.

Figure 5:
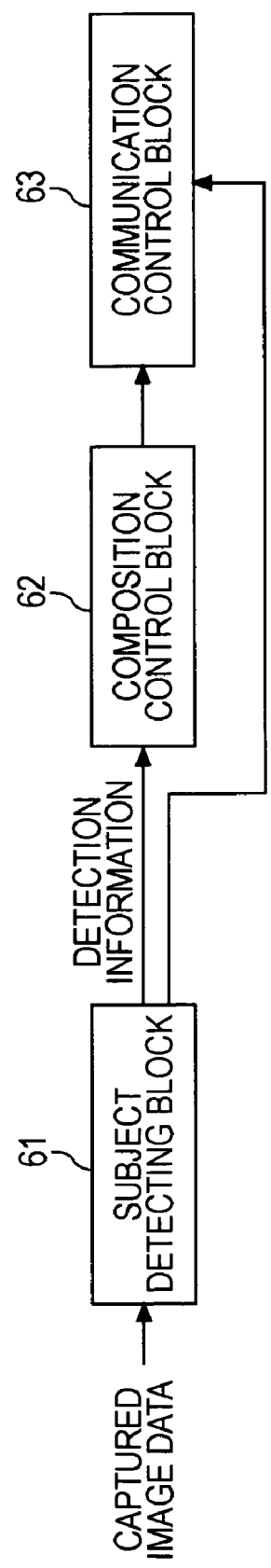
FIG. 5 is a diagram illustrating functions in units of blocks corresponding to composition control provided in the digital still camera according to the embodiment.

FIG. 5 illustrates an example of a configuration of a functional unit corresponding to composition control according to the embodiment, provided in the digital still camera 1.

Referring to FIG. 5, a subject detecting block 61 performs a subject detecting process including search control of a subject by using captured image data obtained in the signal processing unit 24 based on imaging signals obtained in the image sensor 22. Here, the subject detecting process means a process of discriminating and detecting a subject as a person in the image content of captured image data. The information obtained as a detection result (detection information) includes the number of subjects as people, the positional information of each individual subject in a screen, and the size (occupancy area) of each individual subject in an image. In the embodiment, information of the face orientation of each individual subject (subject orientation information) is also obtained as the detection information. Here, the face orientation is regarded as the orientation of an individual subject as a person in the screen of captured image data.

For simplicity and easy understanding, the following description is given based on the assumption that a detection result of a face orientation is obtained in two stages of right and left. For example, even if it can be determined that a subject is substantially front-oriented, a detection result of any of right and left is obtained in accordance with a predetermined algorithm.

Depending on the structure of a composition determining algorithm, composition control according to the embodiment can be realized by obtaining only the number of subjects and subject orientation information as detection information.

As a specific method of the above-described subject detecting process, a technique of face detection can be used. Some methods of face detection are used in related arts, but the method to be adopted in the embodiment is not particularly limited, and an appropriate method may be adopted in view of detection accuracy and the degree of difficulty in design.

Also, the above-described face orientation can be detected by applying the technique of face detection. For example, when a face detecting process is performed based on pattern recognition using feature points, such as a nose, the face orientation can be recognized based on positional and distance relationships among those feature points in the entire detected face.

If there is a useful method for detecting the orientation of an individual subject as a person other than application of the above-described face detection technique, such as detection of the orientation of a body portion or detection of a line of sight, the useful method may be used without a particular problem. That is, as a method or algorithm for detecting the orientation of an individual subject (subject orientation) or detecting a face orientation, an appropriate method may be selected from among methods including those used in related arts, and the selected method may be adopted.

The subject detecting process performed by the subject detecting block 61 can be realized as the image signal processing in the signal processing unit 24. In the case where the signal processing unit 24 is constituted by a DSP (digital signal processor) as described above, the subject detecting process is realized by the program and instructions given to the DSP as the signal processing unit 24.

During subject search control, a control signal to drive the above-described pan/tilt mechanism is output via a communication control block 63 in order to control the pan/tilt mechanism of the pan/tilt head 10.

The detection information which is a result of the subject detecting process generated by the subject detecting block 61 is input to a composition control block 62.

The composition control block 62 decides a composition regarded as optimum (optimum composition) by using the detection information about the subject input thereto. Then, the composition control block 62 performs control to obtain the decided optimum composition (composition control). The composition control in this case includes control of changing an angle of view (in the embodiment, it means a field of view changeable in accordance with control of a zoom lens), control of a shooting direction along a pan (right or left) direction (pan control), and control of a shooting direction along a tilt (upward or downward) direction (tilt control). In order to change the angle of view, control of moving the zoom lens in the optical system unit 21 of the digital still camera 1 is performed or image signal processing of clipping an image on the captured image data is performed. The pan control and tilt control are performed by controlling and moving the pan/tilt mechanism of the pan/tilt head 10. When control of the pan/tilt mechanism is performed, the composition control block 62 allows a control signal to set the pan/tilt mechanism at a desired position to be transmitted to the pan/tilt head 10 via the communication control block 63.

The process of deciding and controlling a composition performed by the above-described composition control block 62 can be performed by the control unit 27 (CPU) based on a program. Alternatively, the process performed by the signal processing unit 24 based on a program may be used together. The communication control block 63 performs a communication process with the communication unit 52 of the pan/tilt head 10 in accordance with a predetermined protocol, and serves as a functional unit corresponding to the pan/tilt head-compatible communication unit 34.

Next, an example of the subject detecting process performed by the subject detecting block 61 is described with reference to FIGS. 6A and 6B.

Assume that the subject detecting block 61 has taken in captured image data having the image content illustrated in FIG. 6A. The image content of the captured image data is obtained by capturing an image in which a subject as a person exists. FIG. 6A (and FIG. 6B) illustrates a state where a screen is divided in a matrix pattern. This schematically illustrates that the screen as captured image data is composed of a set of a predetermined number of horizontal and vertical pixels.

By performing subject detection (face detection) on the captured image data having the image content illustrated in FIG. 6A, the face of an individual subject SBJ illustrated in the figure is detected. That is, detection of a face through a face detecting process is equivalent to detection of an individual subject. As a result of the detection of an individual subject, information of the number, orientation, position, and size of the individual subject is obtained, as described above.

Regarding the number of individual subjects, the number of faces detected through face detection may be obtained. In the case illustrated in FIG. 6A, the number of detected faces is 1, and thus the number of individual subjects is 1.

Figure 7:
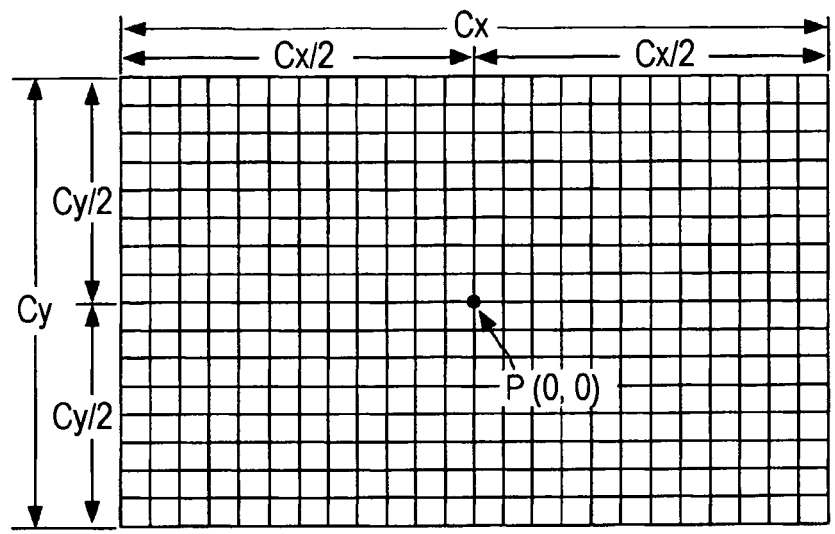
FIG. 7 is a diagram illustrating origin coordinates set on a screen of captured image data.

As the positional information of each individual subject, at least a barycenter G (X,Y) of the individual subject SBJ in the image as the captured image data is obtained. In this case, X and Y origin coordinates P (0, 0) on the screen of the captured image data as a reference of the barycenter G (X, Y) is the intersection of a middle point of a width (horizontal image size) Cx in the X-axis direction (horizontal direction) corresponding to the screen size and a middle point of a width (vertical image size) Cy in the Y-axis direction (vertical direction), as illustrated in FIG. 7.

A method for detecting the barycenter of a subject according to a related art can be adopted to define the position of the barycenter G of an individual subject in an image or to set the barycenter G.

The size of each individual subject can be obtained by calculating the number of pixels in an area specified and detected as a face portion by a face detecting process or the like.

The face orientation of each individual subject is detected as any of right and left based on the face detecting process, as described above.

On the other hand, if the captured image data illustrated in FIG. 6B is taken in and if the subject detecting block 61 performs a subject detecting process, the existence of two faces is detected through face detection, so that a result indicating that the number of individual subjects is 2 can be obtained. Here, the two individual subjects are discriminated from each other: the left one is an individual subject SBJ0; and the right one is an individual subject SBJ1. The coordinates of the barycenter G of the individual subjects SBJ0 and SBJ1 are G0 (X0, Y0) and G1 (X1, Y1), respectively.

In the case where two or more individual subjects are detected in this way, the barycenter of a synthetic subject composed of the plurality of individual subjects, that is, the barycenter Gt (Xg, Yg) of the synthetic subject, is calculated.

There are some ways to set the barycenter Gt of the synthetic subject. In this case, the easiest way is adopted: the middle point of a line connecting the barycenters of the leftmost and rightmost individual subjects on the screen among the plurality of detected individual subjects is set as the barycenter Gt of the synthetic subject. The barycenter Gt of the synthetic subject is information that can be used in composition control, as described below, and is information that can be obtained through calculation after information of barycenters of individual subjects has been obtained. Therefore, the barycenter Gt of the synthetic subject may be obtained by the subject detecting block 61 and output as detection information. Alternatively, the barycenter Gt of the synthetic subject may be obtained by the composition control block 62 by using information about the barycenters of the rightmost and leftmost individual subjects in information indicating the positions of the barycenters of the individual subjects obtained as detection information.

Other than the above-described methods, the following setting method may also be used. That is, a weighting coefficient is assigned in accordance with the sizes of a plurality of individual subjects, and an arrangement is made by using the weighting coefficient so that the position of the barycenter Gt of the synthetic subject is close to one of the individual subjects having a large size.

The size of each of the individual subjects SBJ0 and SBJ1 can be obtained by calculating the number of pixels occupied by a detected face of the subject.

Next, a composition that can be obtained by composition control as a first example of the embodiment is described with reference to FIGS. 8 to 10.

Figure 8:
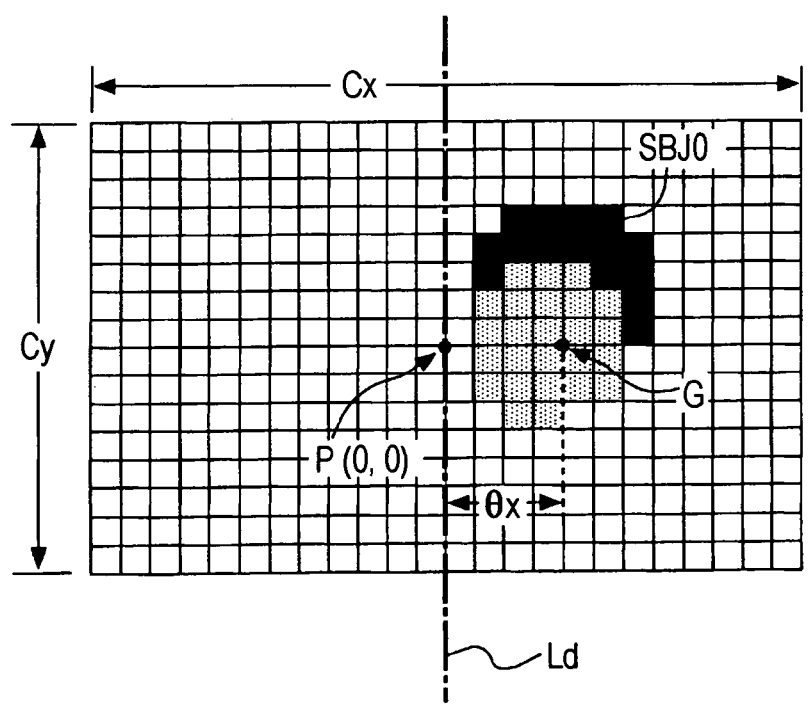
FIG. 8 is a diagram schematically illustrating an example of first composition control in the case where the number of detected individual subjects is 1.

FIG. 8 illustrates the case where image content including an individual subject SBJ0 has been obtained as captured image data through subject detection as a result of subject search.

In the embodiment, when the pan/tilt head 10 to which the digital still camera 1 is attached is normally set, the orientation of the digital still camera 1 is set so that a horizontally-oriented image is captured. Thus, the first example and a second example described below are based on the assumption that a horizontally-oriented image is obtained by imaging.

In the case where one individual subject has been detected as illustrated in FIG. 8, the size of the individual subject SBJ0 is changed so that the occupancy of the individual subject SBJ0 in the screen of the captured image data has a predetermined value regarded as optimum. For example, if the occupancy of the individual subject in the screen is lower than the predetermined value in a stage where the individual subject is detected, zoom control of reducing the angle of view is performed so that the occupancy of the individual subject increases to the predetermined value. If the occupancy of the individual subject in the screen is higher than the predetermined value, zoom control of increasing the angle of view is performed so that the occupancy of the individual subject decreases to the predetermined value. By performing such zoom control, the subject size is changed to an appropriate size in the case where the number of detected individual subjects is 1.

In the case where the number of detected individual subjects is 1, the position of the subject (subject position) on the screen is adjusted in the following manner.

As for the subject position, information of a detected face orientation is used. The individual subject SBJ0 illustrated in FIG. 8 has been detected with the face oriented to the left. At this time, when the screen of the image content illustrated in FIG. 8 is actually viewed, the viewer views that the face of the individual subject SBJ0 is oriented to the left in the screen. In the real world, an actual person as the individual subject SBJ0 faces to the right, with the side facing the imaging apparatus performing imaging being the front.

For adjustment of the subject position, a vertical line passing the origin coordinates P (0, 0) in the image, that is, an image area dividing line Ld which is a straight line corresponding to a Y-axis line and which is a reference line of adjustment of the subject position, is virtually set.

If the face orientation is detected as left as in the above-described case, the barycenter G of the individual subject SBJ0 is placed at the position moved from a position (X=0) corresponding to the image area dividing line Ld to the right by a movement amount represented by a horizontal offset amount θx (horizontal shift position). For this purpose, control is performed to drive the pan mechanism of the pan/tilt head 10 so that the barycenter G is positioned at the horizontal shift position.

In general, a composition where a subject is positioned at the center of a screen is regarded as a typically unfavorable composition. A better composition can be obtained by displacing the position of a subject from the center of a screen in accordance with a certain rule, represented by the rule of thirds or golden section. According to the embodiment, the position (barycenter G) of the individual subject SBJ0 in the horizontal direction of the screen is moved by a predetermined amount (horizontal offset amount θx) from the center of the screen in accordance with such a composition deciding method.

Furthermore, according to the embodiment, when the face orientation of the detected individual subject is the left, the position in the horizontal direction of the barycenter G of the subject is placed in an image area on the right, opposite to the left to which the face is oriented, among the two right and left image areas (divided areas) defined by the image area dividing line Ld along the Y-axis line, as illustrated in FIG. 8. Accordingly, space can be obtained on the left, which is the orientation of the face of the detected subject SBJ0 in the screen. In this way, a better composition can be obtained compared to the case where the barycenter G of the individual subject SBJ0 whose face orientation is left is positioned at the center of the screen in the horizontal direction or the case where the barycenter G is positioned in the left image area with respect to the image area dividing line Ld.

There are various algorithms to decide a real value of the horizontal offset amount θx in the embodiment, but the decision is made based on the rule of thirds in the embodiment. The rule of thirds is one of the most basic composition setting methods. In this method, a subject is positioned on any of virtual lines dividing a rectangular screen into three segments in the vertical and horizontal directions, respectively, so as to obtain a good composition.

For example, referring to FIG. 8, the horizontal offset amount θx is set so that the barycenter G is positioned on the right virtual line among two virtual lines that divide the horizontal image size Cx into three segments and that extend along the vertical direction of the screen. Accordingly, an optimum composition for the position of the subject in the horizontal direction according to the face orientation of the individual subject can be obtained.

Although not illustrated in the drawings, if it has been detected that the face orientation of a detected individual subject SBJ is right, the barycenter G of the individual subject SBJ is positioned at the horizontally line-symmetrical position of the position illustrated in FIG. 8 with respect to the image area dividing line Ld. That is, a value obtained by inverting positive/negative of the value in the case of FIG. 8 is set as the horizontal offset amount θx in this case, and pan control is performed based on the horizontal offset amount θx.

Figure 9A:
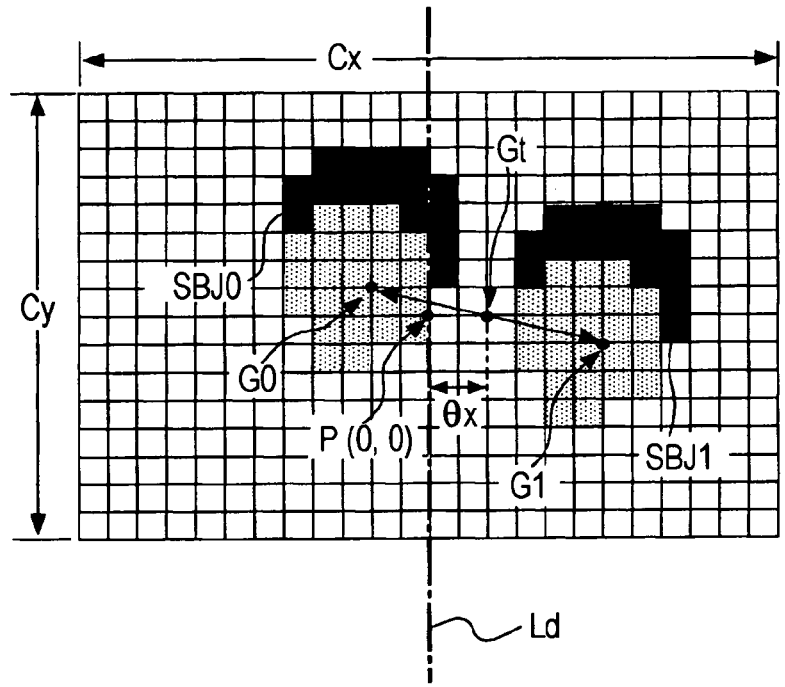
FIGS. 9A and 9B are diagrams schematically illustrating examples of the first composition control in the cases where the number of detected individual subjects is 2.

In the case where two individual subjects SBJ0 and SBJ1 have been detected as illustrated in FIG. 9A, composition control is performed in the following manner. First, adjustment (zoom control) is performed so that the size of a synthetic subject image portion composed of a group of image portions of the individual subjects SBJ0 and SBJ1 (the occupancy of a subject image portion in the entire screen) has an optimum value corresponding to the case where the number of individual subjects is 2.

There are some methods for defining the synthetic subject image portion and calculating the size thereof. For example, the size can be calculated by adding the sizes of image portions of the plurality of detected individual subjects. Alternatively, the size may be calculated as the size of an image portion defined by a virtually-drawn line surrounding all the plurality of detected individual subjects.

As for the position in the horizontal direction of the two individual subjects SBJ0 and SBJ1, information of the face orientations of the two individual subjects SBJ0 and SBJ1 is used.

Assume that the face orientations of the two individual subjects SBJ0 and SBJ1 illustrated in FIG. 9A have been detected as left. In other words, the face orientations of all the two individual subjects are the same, that is, left-oriented in this case.

In this case, as in FIG. 8 where the face orientation of the individual subject SBJ0 is left, the synthetic subject image portion composed of the individual subjects SBJ0 and SBJ1 is positioned on the right side of the image area dividing line Ld, opposite to left to which the faces are oriented, so that space is provided on the light side of the screen. For this purpose, as illustrated in FIG. 9A, a horizontal offset amount θx for displacement to the right by a predetermined amount is set, and pan control is performed so that the barycenter Gt of the synthetic subject, which is the barycenter of the synthetic subject image portion composed of the two individual subjects SBJ0 and SBJ1, is positioned at the position moved by the horizontal offset amount θx from the vertical line (Y-axis line) passing the origin coordinate P (0, 0), which is the image area dividing line Ld.

Although not illustrated in the drawings, if the face orientations of the two individual subjects SBJ0 and SBJ1 are right, pan control is performed so that the barycenter Gt of the synthetic subject is positioned at the line-symmetrical position of the position illustrated in FIG. 9A with respect to the image area dividing line Ld (the position moved by the absolute value of the horizontal offset amount θx from the Y-axis line in the left image area).

Note that, if the horizontal offset amount θx that is regarded as optimum for the case where the number of individual subjects is 1 is given in the case where the number of individual subjects is two or more, a composition having an impression of too far right (or too far left) is likely to be generated. Therefore, in the case where the number of individual subjects is 2 as illustrated in FIG. 9A, a value (absolute value) smaller than that in the case where the number of individual subjects is 1 as illustrated in FIG. 8 is set as the horizontal offset amount θx in accordance with a predetermined rule.

Figure 9B:
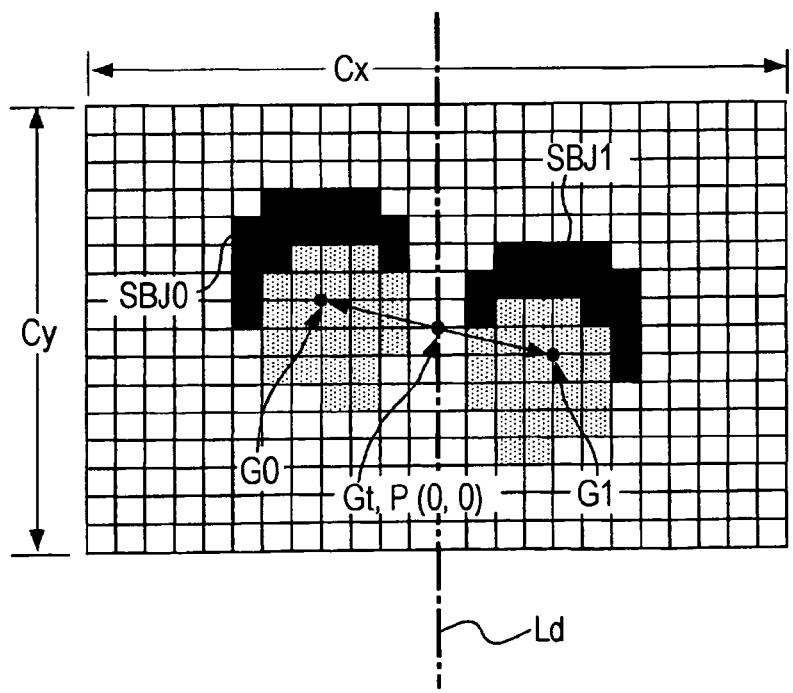

FIG. 9B illustrates an example of the case where the detected face orientations of the two individual subjects SBJ0 and SBJ1 are left and right, respectively. This is an example of the case where the number of individual subjects is 2 and where the face orientations of the subjects are different from each other.

In this case, as for the position of the synthetic subject image portion in the horizontal direction, adjustment (pan control) is performed so that the barycenter Gt of the synthetic subject composed of the two individual subjects SBJ0 and SBJ1 is positioned on the image area dividing line Ld, as illustrated in FIG. 9B.

In the composition obtained accordingly, the synthetic subject image portion composed of the two individual subjects SBJ0 and SBJ1 is positioned at almost the center of the screen in the horizontal direction. In such a case where the number of subjects is two or more and where the orientations of those subjects are different, a good composition can be obtained accordingly even if the synthetic subject image portion is at the center.

Figure 10:
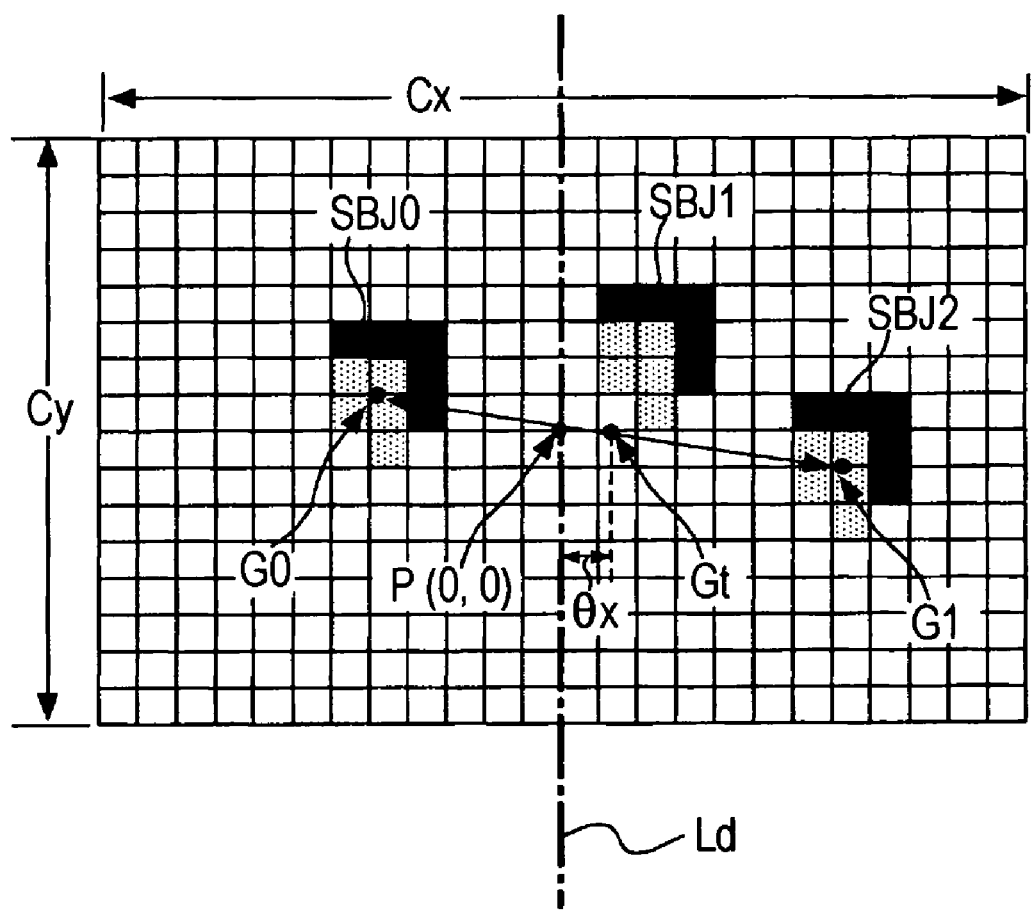
FIG. 10 is a diagram schematically illustrating an example of the first composition control in the case where the number of detected individual subjects is 3.

FIG. 10 illustrates a case where three individual subjects SBJ0, SBJ1, and SBJ2 have been detected.

In this case, composition control is performed in the following manner. First, adjustment (zoom control) is performed so that the size of a synthetic subject image portion composed of the individual subjects SBJ0, SBJ1, and SBJ2 has an optimum value corresponding to the case where the number of individual subjects is 3.

Then, as for the position in the horizontal direction of the synthetic subject image portion, information of the face orientations detected for the respective individual subjects is used. In FIG. 10, the face orientations of all the three individual subjects SBJ0, SBJ1, and SBJ2 are the same (left).

In this case, as in the case illustrated in FIG. 9A, setting of the horizontal offset amount θx and pan control to move the barycenter Gt of the synthetic subject to a certain position determined by the horizontal offset amount θx are performed so as to displace the image area portion composed of the individual subjects SBJ0, SBJ1, and SBJ2 to the right image area defined by the image area dividing line Ld. If the face orientations of all the three individual subjects SBJ0, SBJ1, and SBJ2 are the same (right), pan control is performed so that the barycenter Gt of the synthetic subject is positioned at the horizontally line-symmetrical position of the position illustrated in FIG. 10 with respect to the image area dividing line Ld.

The horizontal offset amount θx set at this time has an absolute value smaller than that in the case of FIG. 9A where the number of detected individual subjects is 2. Accordingly, the position of the subjects in the horizontal direction is further optimized for the case where the number of individual subjects is 3, so that a good composition can be obtained.

In the first example of composition control, if the face orientations of the three individual subjects SBJ0, SBJ1, and SBJ2 are not the same, a composition in which the barycenter Gt of the synthetic subject is positioned on the image area dividing line Ld (Y-axis line) is obtained, as in FIG. 9B.

According to the description given above, it can be understood that the position adjustment in the horizontal direction in the first example of composition control is performed based on the face orientation detected for each individual subject. That is, as the most basic control, when the number of individual subjects is 1, the barycenter G of the subject (the barycenter Gt of the synthetic subject) is displaced by a predetermined amount to the right or left of the image area dividing line Ld (Y-axis line) to perform horizontal offset of the barycenter G depending on whether the face orientation of the individual subject is right or left, so that space is provided in the same side as the face orientation in the screen.

When the number of individual subjects is plural (two or more), if the face orientations of all the individual subjects are the same, horizontal offset of the barycenter Gt of the synthetic subject is performed in accordance with the above-described position adjustment. If the face orientations are different, horizontal offset is not performed and the barycenter Gt of the synthetic subject is positioned at the X coordinate corresponding to the image area dividing line Ld so that the synthetic subject image portion is positioned at almost the center of the screen.

Then, when horizontal offset of the barycenter Gt of the synthetic subject (the barycenter G is regarded as the barycenter Gt of the synthetic subject when the number of individual subjects is 1) is performed, the horizontal offset amount θx is changed in accordance with the number of individual subjects as described above with reference to FIGS. 8 to 10. In this way, an arrangement is made so that an optimum position of the synthetic subject image portion in the horizontal direction in the screen can be obtained in accordance with the number of individual subjects.

Figures 11, 11A, 11B:
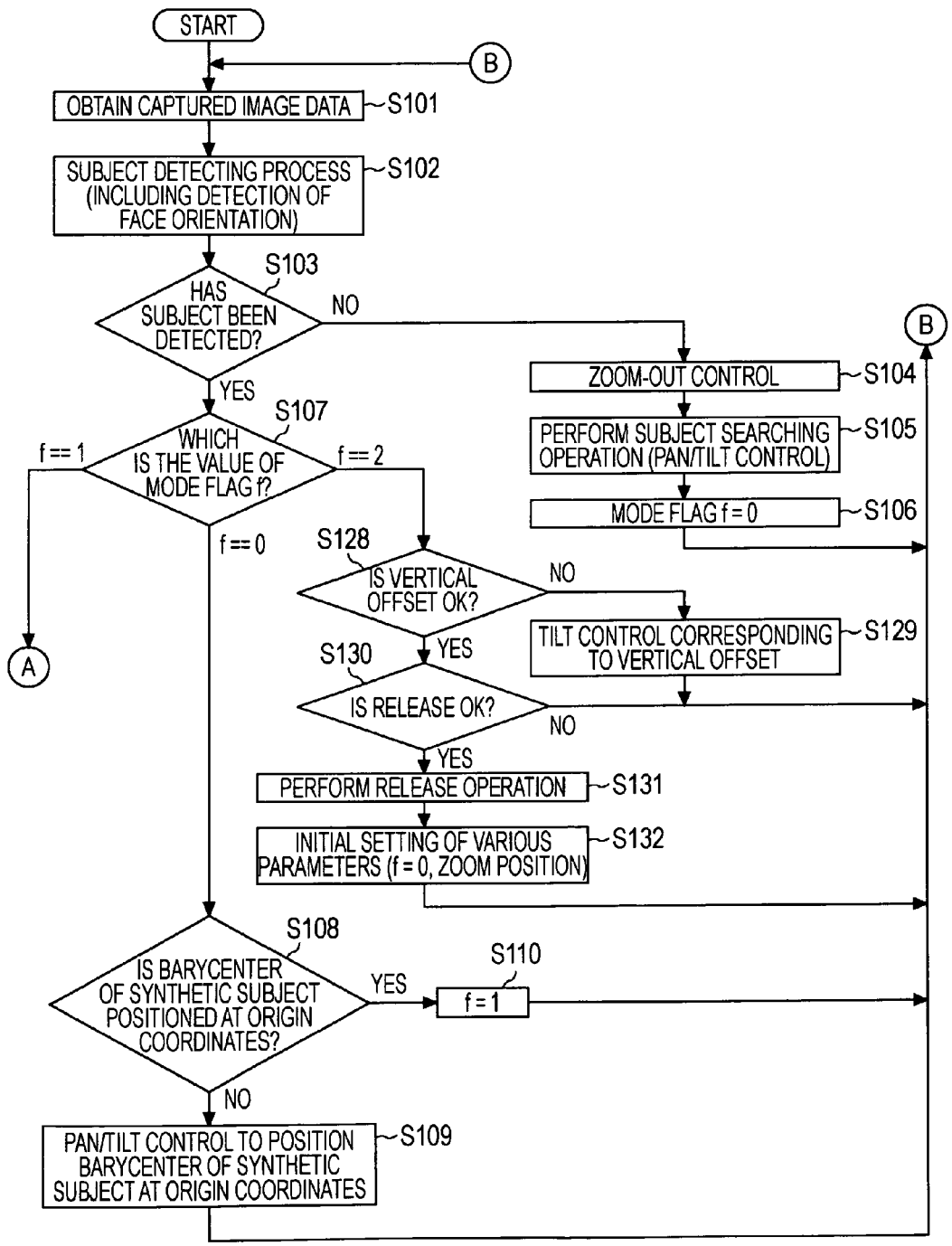
FIGS. 11A and 11B illustrate a flowchart of an example of a process procedure for the first composition control.
Figure 11B:
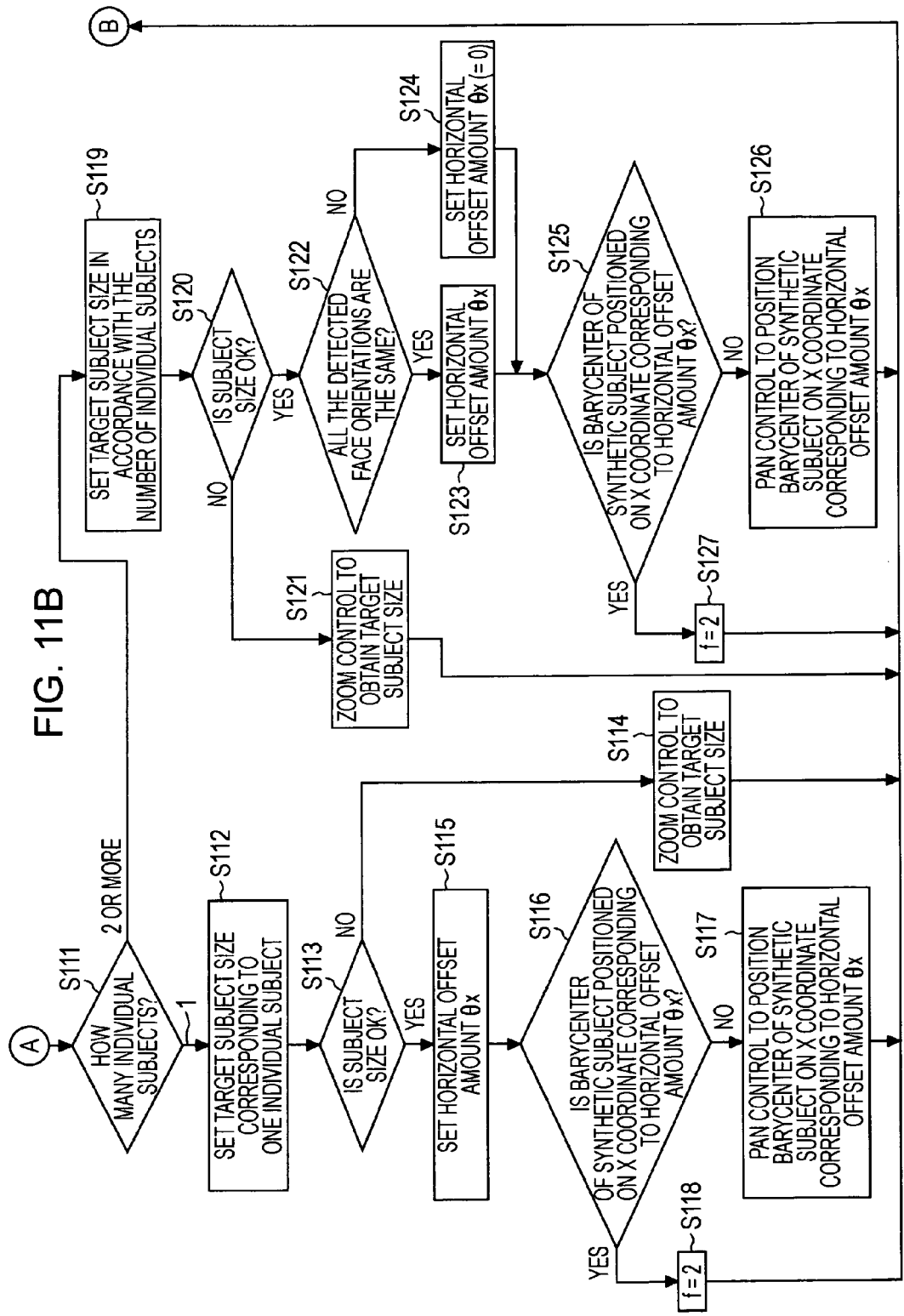

FIGS. 11A and 11B illustrate an example of a procedure of the first example of composition control described above with reference to FIGS. 8 to 10 performed by the subject detecting block 61, the composition control block 62, and the communication control block 63 illustrated in FIG. 5. The process illustrated in FIGS. 11A and 11B is realized when the signal processing unit 24 as a DSP and the CPU in the control unit 27 perform a program. Such a program is written and stored in a ROM or the like during manufacture. Alternatively, the program may be stored in a removable storage medium and then installed (including update) from the storage medium so as to be stored in a nonvolatile storage area compatible with the DSP or the flash memory 30. Also, the program may be installed via a data interface, such as a USB or IEEE 1394, under control by another host apparatus. Furthermore, the program may be stored in a storage device in a server or the like on a network and obtained by downloading it from the server while allowing the digital still camera 1 to have a network function.

In the following description with reference to the flowchart, the terms "barycenter Gt of the synthetic subject" and "synthetic subject image portion" used above are applied to not only the case where the number of detected individual subjects is 2 or more but also the case where the number of detected individual subjects is 1. That is, the barycenter G illustrated in FIG. 8 is equivalent to the barycenter Gt of the synthetic subject in the case where the number of detected individual subjects is 1. Also, the image portion composed of only the individual subject SBJ0 illustrated in FIG. 8 is equivalent to the synthetic subject image portion in the case where the number of detected individual subjects is 1.

Steps S101 to S106 correspond to a procedure to search for and detect a subject and are mainly performed by the subject detecting block 61.

In step S101, captured image data based on imaging signals from the image sensor 22 is taken in and obtained. In step S102, a subject detecting process is performed by using the captured image data obtained in step S101. In the subject detecting process, it is determined whether an individual subject exists in image content as the captured image data by using the above-described method of face detection or the like. If an individual subject exists, the number of individual subjects, and the position (barycenter), size, and face orientation of each individual subject are obtained as detection information.

In step S103, it is determined whether the existence of an individual subject has been detected as a result of the subject detecting process in step S102. If a negative determination result is obtained, that is, if the existence of an individual subject has not been detected (the number of detected individual subjects is 0), the process proceeds to step S104, where zoom lens movement control of increasing the angle of view (zoom-out control) is performed. By increasing the angle of view, an image of a wider range can be captured and thus an individual subject can be easily caught accordingly. At the same time, control to move the pan/tilt mechanism of the pan/tilt head 10 (pan/tilt control) is performed to search for a subject in step S105. At this time, the control is performed such that the subject detecting block 61 supplies a control signal for the pan/tilt control to the communication control block 63 and that the control signal is transmitted to the communication unit 52 of the pan/tilt head 10.

The pattern of moving the pan/tilt mechanism of the pan/tilt head 10 in the pan/tilt control to search for a subject may be decided so that the search is efficiently performed.

In step S106, a mode flag "f" is set to 0 (f=0) and the process returns to step S101.

In this way, the procedure of steps S101 to S106 is repeated until at least one individual subject is detected in the image content of captured image data. At this time, the system including the digital still camera 1 and the pan/tilt head 10 is in a state where the digital still camera 1 is moved in pan and tilt directions to search for a subject.

If a positive determination result is obtained in step S103, that is, if the existence of an individual subject has been detected, the process proceeds to step S107. The procedure from step S107 is mainly performed by the composition control block 62.

In step S107, the value currently set in the mode flag "f" is determined.

If it is determined that f=0, the value indicates that an initial rough subject catching mode should be performed as composition control, and thus the procedure starting from step S108 is performed as illustrated in FIGS. 11A and 11B.

In step S108, it is determined whether the barycenter Gt of a synthetic subject is positioned at the origin coordinates P (0, 0) (see FIG. 7) on the screen of the captured image data (the screen obtained by displaying the image content of the captured image data). If a negative determination result is obtained, that is, if the barycenter Gt of the synthetic subject has not been positioned at the origin coordinates, the process proceeds to step S109, where control to move the pan/tilt mechanism of the pan/tilt head 10 is performed so that the barycenter Gt of the synthetic subject is positioned at the origin coordinates, and then the process returns to step S101. As described above, in the catching mode which is the first procedure of composition control in a state where the existence of an individual subject has been detected, the pan/tilt mechanism of the pan/tilt head 10 is controlled so that the barycenter Gt of a synthetic subject is positioned at the origin coordinates as an initial reference position, whereby the image area including the detected individual subject is positioned at the center of the screen.

Now, an example of an algorithm for actually performing the pan/tilt control in step S109 is described.

In a state where an individual subject is detected with the mode flag f=0, the subject detecting block 61 performs calculation in accordance with the following expression (1) so as to obtain a necessary movement amount Span in a pan direction and a necessary movement amount Stilt in a tilt direction. In the following expression (1), "n" indicates the number of detected individual subjects, and "P (Xi, Yi)" indicates the X and Y coordinates of the barycenter of an i-th individual subject among the individual subjects to which numbers of 0 to n−1 are assigned. For confirmation, the origin coordinates (0, 0) in this case are at the intersection of the middle point in the horizontal direction and the middle point in the vertical direction in the screen, as illustrated in FIG. 7.

$$(S_{pan}, S_{tilt}) = \frac{\sum_{i=0}^{n-1} p(x_i, y_i)}{n} \quad (1)$$

For example, in step S108, whether the barycenter Gt of the synthetic subject is at the origin coordinates P can be determined by determining whether the absolute values of the necessary movement amounts Span and Stilt calculated in the above-described manner are within a predetermined range (strictly 0, but the value may be larger than 0). Then, in step S109, pan/tilt control is performed so that the absolute values of the necessary movement amounts Span and Stilt are within the predetermined range. At this time, the velocity of the pan mechanism unit 53 and the tilt mechanism unit 56 at the pan/tilt control may be constant. Alternatively, the velocity can be changed, for example, the velocity can be increased as the necessary movement amounts Span and Stilt become larger. Accordingly, the barycenter Gt of the synthetic subject can be positioned at the origin coordinates in relatively short time even if the necessary movement amount by panning or tilting is large.

If a positive determination result is obtained in step S108, that is, if the barycenter Gt of the synthetic subject is positioned at the origin coordinates, the mode flag "f" is set to 1 (f=1) in step S110, and the process returns to step S101. The state where the mode flag "f" is set to 1 in step S110 is a state where the catching mode as the first procedure in composition control has been completed and where first composition adjustment control (composition adjusting mode) should be performed.

In the case where the mode flag is set to f==1 and where the first composition adjusting mode should be performed, the process proceeds from step S107 to step S111. In the first composition adjusting mode, zoom (angle of view) adjustment and pan control are performed to obtain an optimum composition in accordance with the number of detected individual subjects and a combination of face orientations of the individual subjects. Note that, depending on the angle-of-view adjustment and pan control, the size and position of each individual subject in the screen may be changed.

In step S111, the number of individual subjects that have been detected is determined. If the number is 1, the procedure starting from step S112 is performed.

In step S112, a target subject size corresponding to the case where the number of detected individual subjects is 1 is set. Here, the target subject size means a size that is compositionally optimum as the size of a synthetic subject image portion in the screen. For example, in the correspondence with FIG. 8, the target subject size corresponds to "a value within a predetermined range in which the occupancy of (one) individual subject SBJ0 in the screen of captured image data is regarded as optimum".

In step S113, whether the size of the individual subject is OK is determined. The state where the size of the individual subject is OK means a state where the individual subject detected at the time has the target subject size set in step S112. If a negative determination result is obtained in step S113, the process proceeds to step S114, where zoom lens drive control (zoom control) is performed so that the individual subject has the target subject size, and the process returns to step S101.

At this time, the zoom control is performed while maintaining the position in the horizontal (right and left) direction of the barycenter Gt of the synthetic subject at the position corresponding to the X coordinate (X=0) set in step S109. Accordingly, the state where the individual subject is positioned at almost the center in the horizontal direction can be maintained. Also, since the zoom-out control is performed in step S104 during the subject searching operation, the zoom control performed in step S114 is likely to be zoom-in control. However, if the size of the individual subject detected at that time is larger than the target subject size for some reason and if a negative determination result is obtained in step S113, zoom-out control is performed in step S114 so that the actual individual subject has the target subject size.

If a positive determination result is obtained in step S113, the process proceeds to step S115.

In step S115, the horizontal offset amount θx is set.

In the first composition control according to the embodiment, the horizontal offset amount θx is calculated by using the following expression (2).

$$\theta x = D \times (Cx/6)/n \quad (2)$$

In expression (2), "D" is a coefficient to which any of +1, −1, and 0 is set based on a face orientation or a combination (relationship) of a plurality of face orientations. "Cx" indicates a horizontal image size. The term "Cx/6" corresponds to the X coordinate of a virtual line along the vertical direction obtained based on the rule of thirds. "n" indicates the number of detected individual subjects.

In step S115, the number of detected individual subjects is 1 and thus n=1. The face orientation is any of right and left. The coefficient D is +1 when the face orientation is left and is −1 when the face orientation is right.

When the face orientation of the detected individual subject is left, θx=−Cx/6 is satisfied. The horizontal offset amount θx indicates the position on a vertical line moved to the right by Cx/6 from the vertical line passing the origin coordinates P (0, 0) (image area dividing line Ld: Y-axis line). The position of this vertical line corresponds to the right virtual line among two virtual lines based on the rule of thirds.

On the other hand, when the face orientation of the detected individual subject is right, the horizontal offset amount θx is Cx/6. This indicates the position on a vertical line moved to the left by Cx/6 from the vertical line passing the origin coordinates P (0, 0) (image area dividing line Ld: Y-axis line). The position of this vertical line corresponds to the left virtual line among the two virtual lines based on the rule of thirds.

In step S116, it is determined whether the barycenter Gt of the synthetic subject (in this case, the number of individual subjects is 1, and thus the barycenter G in FIG. 8 is the same as the barycenter Gt of the synthetic subject) is positioned on the X coordinate corresponding to the horizontal offset amount θx set in step S115. If a negative determination result is obtained in step S116, the process proceeds to step S117.

In step S117, pan control is performed so that the barycenter Gt of the synthetic subject is positioned on the X coordinate corresponding to the horizontal offset amount θx, and the process returns to step S101.

Then, after the barycenter Gt of the synthetic subject has been positioned on the X coordinate corresponding to the horizontal offset amount θx through the control in step S117, a positive determination can be obtained in step S116. When a positive determination result is obtained in step S116, the barycenter of the individual subject (SBJ) is at the position moved to left or right from the image area dividing line Ld by the horizontal offset amount θx in accordance with the face orientation thereof, as illustrated in FIG. 8.

If a positive determination result is obtained in step S116, the process proceeds to step S118, where the mode flag "f" is set to 2 and the process returns to step S101. The state where the mode flag is set to f==2 is a state where the first composition adjustment has been completed and where a release operation should be performed after a second composition adjusting mode, as can be understood from the following description.

If it is determined in step S111 that the number of detected individual subjects is 2 or more, the procedure starting from step S119 is performed.

In step S119, a target subject size is set. When the number of individual subjects is 2 or more, the target subject size to obtain an optimum composition varies depending on the number of individual subjects. Thus, in step S119, a predetermined target subject size is set in accordance with the number of individual subjects detected in step S102. For confirmation, the target subject size in the case where the number of individual subjects is 2 or more is set for a synthetic subject image portion composed of all the detected individual subjects.

In step S120, it is determined whether the size of each individual subject is OK. That is, it is determined whether the synthetic subject image portion obtained from the detection information about the individual subjects has the target subject size set in step S120.

If a negative determination result is obtained in step S120, the process proceeds to step S121. In step S121, zoom lens drive control (zoom control) is performed so that the synthetic subject image portion of the individual subjects detected at this time has the target subject size set in step S119, as in step S114, and the process returns to step S101.

On the other hand, if a positive determination result is obtained in step S120, the process proceeds to step S122.

In step S122, it is determined whether the face orientations detected for the plurality of individual subjects are the same.

If a positive determination result is obtained in step S122, the process proceeds to step S123. In step S123, a horizontal offset amount θx is set by using the above-described expression (2).

In this case, any of +1 and −1 is substituted for the coefficient D in expression (2) in accordance with whether the detected face orientations are left or right. Also, a value of 2 or more, which is the number of detected individual subjects, is substituted for "n". As can be understood from this, the absolute value of the calculated θx is smaller as the number of individual subjects is larger depending on expression (2). That is, as described above with reference to FIGS. 8, 9A, and 10, an offset amount from the image area dividing line Ld in the right and left of the synthetic subject image portion is smaller as the number of individual subjects is larger.

On the other hand, if a negative determination result is obtained in step S122, the horizontal offset amount θx is set to 0 in step S124.

In step S124, θx=0 can be set by performing calculation by using expression (2). That is, an algorithm is constituted so that, if a negative determination result is obtained in step S122 (if the face orientations are different), calculation of expression (2) is performed by substituting 0 for the coefficient D in step S124.

After step S123 or S124, the process proceeds to step S125.

In steps S125, S126, and S127, pan control is performed until the barycenter Gt of the synthetic subject is positioned on the X coordinate corresponding to the horizontal offset amount θx set in step S123 or S124, as in the above-described steps S116, S117, and S118. With this control, if the face orientations of the plurality of individual subjects are the same, the synthetic subject image portion (the barycenter Gt of the synthetic subject) can be moved to right or left by the horizontal offset amount θx corresponding to the number of subjects. In this state, a positive determination result is obtained in step S125, so that the mode flag "f" is set to 2 in step S127, and then the process returns to step S101.

In the state where the mode flag "f" is set to 2, the composition control described above with reference to FIGS. 8 to 10 including size adjustment in accordance with the number of individual subjects and position adjustment in the horizontal direction in accordance with the face orientation of each individual subject or their combination has been completed. Thus, if it is determined in step S107 that the mode flag "f" is 2, the second composition adjusting mode is performed in the procedure starting from step S128.

For example, in the description of the composition control with reference to FIGS. 8 to 10, how to set the position of the barycenter of the individual subject in the vertical direction of the screen is not described for simplicity. Actually, however, a better composition may be obtained by moving the position upward from the center of the screen (offset) by a necessary amount. Thus, in the actual composition control according to the embodiment, an offset amount in the vertical direction of the barycenter Gt of the synthetic subject is also set so that a better composition can be obtained as an optimum composition. The procedure for the setting is the second composition adjusting mode, which is performed as steps S128 and S129 described below.

In step S128, it is determined whether the position of the barycenter Gt of the synthetic subject (if the number of individual subjects is 1, the barycenter G of the individual subject) has been displaced from the horizontal line (X-axis) passing the origin coordinates P on the screen by a predetermined vertical offset amount θy (whether barycenter offset is OK).

If a negative determination result is obtained in step S128, the process proceeds to step S129, where tilt control is performed to move the tilt mechanism of the pan/tilt head 10 so that the barycenter is displaced by the set vertical offset amount θy, and the process returns to step S101. In the stage where a positive determination result is obtained in step S128, the position in both horizontal and vertical directions of the synthetic subject image portion corresponding to an optimum composition has been obtained, and also the size of the synthetic subject image portion corresponding to the optimum composition has been obtained. That is, the optimum composition has been obtained.

There are some methods for setting the real value of the vertical offset amount θy corresponding to steps S128 and S129, and the method is not particularly limited. As one of the easiest setting methods, a value of length corresponding to one sixth of a vertical image size Cy from the center in the vertical direction can be given based on the rule of thirds. Of course, a different value depending on the number of individual subjects, the face orientation, and their combination may be set in accordance with a predetermined rule.

If a positive determination result is obtained in step S128, a procedure corresponding to a release operation starting from step S130 is performed. Here, the release operation means an operation of storing the captured image data obtained at the time as still image data in a storage medium (the memory card 40). Specifically, in the case where a manual shutter operation is performed, the release operation means an operation of recording the captured image data obtained at the time as still image data in a storage medium in response to the shutter operation.

In step S130, it is determined whether conditions to perform the release operation are presently satisfied. The conditions include, for example, a focused state has been established (when autofocus control is effective) and the pan/tilt mechanism of the pan/tilt head 10 is in a stopped state.

If a negative determination result is obtained in step S130, the process returns to step S101, so as to wait until the conditions to perform the release operation are satisfied. If a positive determination result is obtained in step S130, the release operation is performed in step S131. In this way, captured image data of an optimum composition can be recorded in the embodiment.

After the release operation has ended, initial setting of necessary parameters is performed in step S132. With this setting, the mode flag "f" is set to an initial value of 0. Also, the position of the zoom lens is returned to a preset initial position.

After step S132, the process returns to step S101. By returning the process from step S132 to S101, an operation of searching for a subject, obtaining an optimum composition according to the orientation of the individual subject(s) detected by search and the number of individual subjects, and performing imaging and recording (release operation) is automatically repeated.

The release operation described above with reference to FIGS. 11A and 11B is an operation of recording a still image based on a captured image in a recording medium. In a broader sense, the release operation according to the embodiment includes an operation of recording the above-described still image on a recording medium and an operation of obtaining necessary still image data from a captured image. Thus, the release operation also includes an operation of obtaining still image data from a captured image in order to transmit the still image data to another recording device via a data interface by the digital still camera 1 of the embodiment.

In the above-described procedure illustrated in FIGS. 11A and 11B, pan/tilt control for catching is performed. That is, in steps S108 and S109, the barycenter Gt of the synthetic subject composed of detected one or more individual subjects is positioned at the origin coordinates P on the screen based on the necessary movement amounts Span and Stilt calculated by using expression (1). Then, in a next stage, the horizontal offset amount θx is calculated based on the number of individual subjects and the relationship among face orientations detected for the respective individual subjects (whether the same or not), and pan control is performed to move the barycenter Gt of the synthetic subject to right or left by the distance corresponding to the horizontal offset amount θx with reference to the vertical line passing the origin coordinates P (image area dividing line Ld: Y-axis line). Furthermore, tilt control is performed to move the barycenter Gt of the synthetic subject upward (or downward) by the distance corresponding to the vertical offset amount θy based on the movement amount indicated by the set vertical offset amount θy with reference to the horizontal line passing the origin coordinates P (X-axis).

Accordingly, in the pan/tilt control in the procedure illustrated in FIGS. 11A and 11B, necessary movement amounts Span and Stilt are calculated by using the following expression (3), and then the pan mechanism is controlled to obtain the movement amount in the screen corresponding to the necessary movement amount Span and the tilt mechanism is controlled to obtain the movement amount in the screen corresponding to the necessary movement amount Stilt.

$$(S_{pan}, S_{tilt}) = \frac{\sum_{i=0}^{n-1} p(x_i, y_i) + (\theta_x, \theta_y)}{n} \quad (3)$$

Hereinafter, second composition control according to the embodiment is described.

Figure 12:
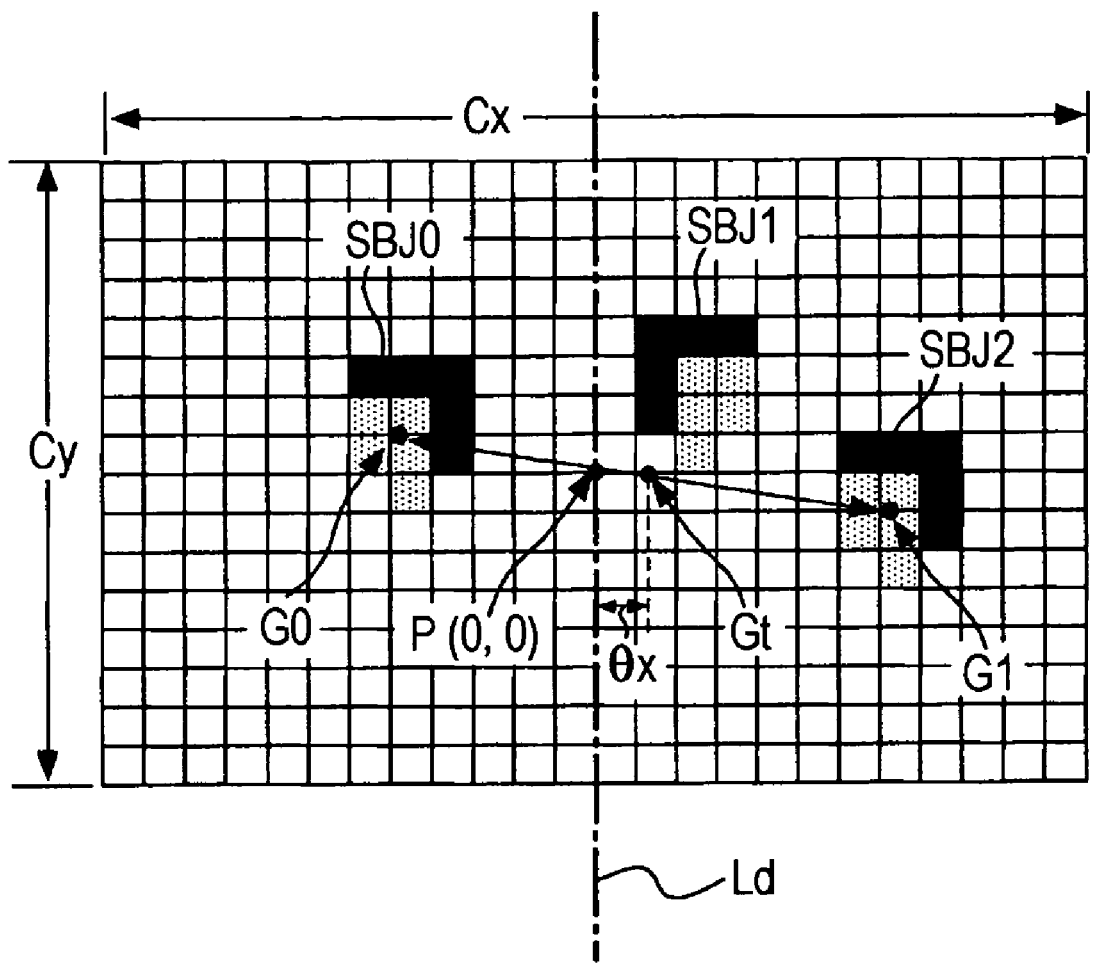
FIG. 12 is a diagram schematically illustrating an example of second composition control in the case where the number of detected individual subjects is 3.

As an example of the second composition control, FIG. 12 illustrates a state where three individual subjects SBJ0, SBJ1, and SBJ2 have been detected. Among those individual subjects, the face orientations detected for the individual subjects SBJ0 and SBJ2 are left, whereas the face orientation detected for the individual subject SBJ1 is right. In this case, the face orientations of all the individual subjects are not the same. Thus, in the first composition control, the composition is set so that the barycenter Gt of the synthetic subject is positioned on the vertical line passing the origin coordinates P (image area dividing line Ld: Y-axis line), as described above with reference to FIG. 9B.

In this case, however, a majority of the three individual subjects: the two individual subjects SBJ0 and SBJ2, faces in the same direction (the face orientations are the same). This situation implies that something important is likely to exist in the direction of eyes of the two individual subjects SBJ0 and SBJ2 rather than the direction of eyes of the individual subject SBJ1. Based on such a point of view, a good composition is likely to be obtained by providing space in the image area indicated by the direction of eyes of the two individual subjects SBJ0 and SBJ2. In this case, the face orientations of the two individual subjects SBJ0 and SBJ2 are detected as left, and thus the synthetic subject image portion composed of the three individual subjects SBJ0, SBJ1, and SBJ2 is positioned in the image area on the right side of the image area dividing line Ld in the screen, so as to obtain a good composition.

In the second composition control, when the number of same face orientations accounts for predetermined percentage or more in the total number of individual subjects in the relationship among the face orientations of individual subjects, the same face orientations are regarded as a reference face orientation. The reference face orientation is the orientation of a synthetic subject composed of the plurality of individual subjects in the screen. Then, the horizontal offset amount θx is calculated and set based on the reference face orientation. By performing such composition control, the composition is set so that the barycenter Gt of the synthetic subject is positioned on the right side of the vertical line passing the origin coordinates P in FIG. 12.

Although not illustrated in the drawings, if the number of same face orientations does not account for the predetermined percentage, that is, if the reference face orientation is not decided, it is preferable in the embodiment to set the composition by positioning the synthetic subject image portion at almost the center in the horizontal direction. Therefore, in this case, the horizontal offset amount θx is set to 0.

FIGS. 13A and 13B illustrate an example of a procedure corresponding to the above-described second composition control performed by the subject detecting block 61, the composition control block 62, and the communication control block 63 illustrated in FIG. 5.

In the procedure illustrated in FIGS. 13A and 13B, steps S201 to S232 except steps S222-1 and S222-2 are the same as steps S101 to S132 in FIGS. 11A and 11B.

Steps S222-1 and S222-2 are inserted as a procedure that should be performed if a negative determination result is obtained in step S222. That is, steps S222-1 and S222-2 are performed in the case where a plurality of individual subjects have been detected and where the face orientations of those individual subjects are not the same in the relationship among the face orientations of the individual subjects in the stage where size adjustment of the synthetic subject image portion has been completed.

In step S222-1, a reference face orientation is decided.

For this purpose, the relationship among face orientations of a plurality of detected individual subjects is determined, as described above. Specifically, it is determined whether there is a group of individual subjects having the same face orientation accounting for a predetermined percentage or more in all the detected individual subjects. If there is such a group of individual subjects, the face orientation of the individual subjects in this group is decided as an effective reference face orientation. If there is not such a group of individual subjects, it is determined that there is no reference face orientation.

The value to be actually set as the predetermined percentage may be appropriately decided to obtain an optimum composition in view of the actual number of individual subjects and the actual relationship among face orientations of the respective individual subjects. Basically, a fixed value may be set as the predetermined percentage, but a different value may be set depending on the decided number of individual subjects.

Furthermore, as the algorithm to decide the reference face orientation, an algorithm other than that described above can be used. For example, without considering the percentage in all the individual subjects, the face orientation of the group having the largest number of individual subjects among groups each having individual subjects of the same face orientation may be decided as an effective reference face orientation. In that case, if there are groups each having the same number of individual subjects of the same face orientation, it is determined that there is no reference face orientation.

In step S222-2, it is determined whether an effective reference face orientation has been decided as a result of the face orientation deciding process in step S222-1.

If a positive determination result is obtained, the process proceeds to step S223. In step S223, the coefficient D is set based on the reference face orientation decided in step S222-1, and the horizontal offset amount θx is calculated and set.

On the other hand, if a negative determination result is obtained in step S222-2, that means an effective reference face orientation indicating right or left was not decided in the preceding step S222-1. Thus, the process proceeds to step S224, where the horizontal offset amount θx is set to 0. In this way, by inserting steps S222-1 and S222-2, the second composition control described above with reference to FIG. 12 is realized.

In the entire flow of the procedure of each composition control illustrated in FIGS. 11A and 11B and FIGS. 13A and 13B, a composition regarded as optimum is determined and decided in accordance with the number of detected individual subjects, and zoom control and pan/tilt control are appropriately performed to actually obtain (reflect) captured image data of the determined composition.

The composition control described above is based on the assumption that the face orientation is detected in two stages of right and left. Actually, however, a face orientation detecting process may be performed in three stages of right, left, and front. In that case, too, the composition control according to the embodiment of the present invention can be effectively applied.

For example, in the case where one individual subject is detected as illustrated in FIG. 8 and where the face orientation is detected as front, the subject position in the horizontal direction may be positioned at almost the center of the screen (the barycenter G is positioned almost on the image area dividing line Ld (Y-axis line)). However, such a composition is regarded as a typically unfavorable composition in many cases. Thus, in the case where the number of detected individual subjects is 1 and where the face orientation thereof is front, the horizontal offset amount θx may be decided to obtain the same composition as that illustrated in FIG. 8 or a line-symmetrical composition of the composition illustrated in FIG. 8 with respect to the image area dividing line Ld. In this way, a good composition based on the rule of thirds can be obtained.

Also, in the case where two or mode individual subjects have been detected, if the face orientations of all the individual subjects are front or if a reference face orientation is front, the horizontal offset amount θx may be calculated by setting the coefficient D in expression (2) to 0.

Furthermore, in the case where a face orientation can be detected also in the vertical direction, the composition control according to the embodiment of the present invention can be performed in accordance with a detection result of the face orientation in the vertical direction. In that case, the barycenter Gt of the synthetic subject is moved in the vertical direction with reference to the image area dividing line Ld along the horizontal direction (e.g., the line in the horizontal direction passing the origin coordinates (X-axis line)).

Furthermore, in the case where a face orientation can be detected also in a slanting direction, which is a synthetic direction of the horizontal and vertical directions, composition control can be performed in accordance with a slanting face orientation. In that case, a line crossing the screen while being orthogonal to the detected slanting face orientation (e.g., a line passing the origin coordinates) may be set as the image area dividing line Ld, and the barycenter Gt of the synthetic subject may be moved to any of the image areas defined by the image area dividing line Ld.

Furthermore, in the case where a face orientation can be detected in two stages or three stages or more in the horizontal direction (or vertical direction), an algorithm to change the horizontal offset amount θx (or vertical offset amount θy) in accordance with the stage (degree) of the detected orientation may be adopted.

In this case, the reference point passed by the reference line corresponds to the origin coordinates on the screen as illustrated in FIG. 7. However, as the position of the reference point, a position other than the origin coordinates may be set to obtain a better composition.

Figure 14:
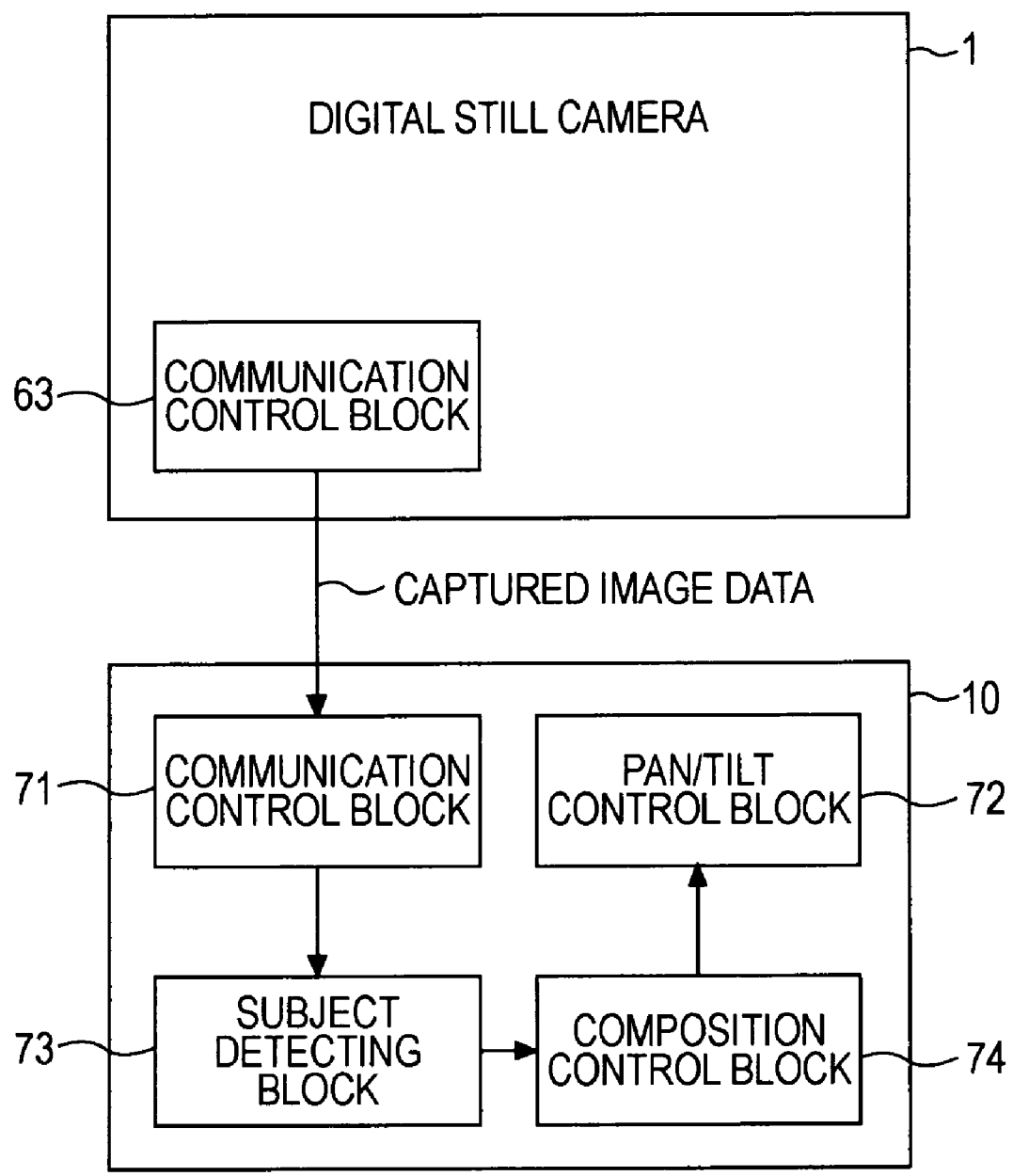
FIG. 14 is a diagram illustrating an example of a configuration as a modification of the imaging system according to the embodiment.

FIG. 14 illustrates an example of a configuration as a modification of the imaging system according to the embodiment.

In FIG. 14, captured image data generated by the signal processing unit 24 based on imaging is transmitted from the digital still camera 1 to the pan/tilt head 10 via the communication control block 63.

In FIG. 14, the pan/tilt head 10 includes a communication control block 71, a pan/tilt control block 72, a subject detecting block 73, and a composition control block 74.

The communication control block 71 is a functional unit corresponding to the communication unit 52 illustrated in FIG. 4 and performs communication with the communication control block 63 (pan/tilt head-compatible communication unit 34) on the digital still camera 1 side in accordance with a predetermined protocol.

The captured image data received by the communication control block 71 is supplied to the subject detecting block 73. The subject detecting block 73 includes a signal processing unit capable of performing at least the subject detecting process equivalent to that performed by the subject detecting block 61 illustrated in FIG. 5, performs the subject detecting process on the captured image data supplied thereto, and outputs detection information to the composition control block 74.

The composition control block 74 is capable of performing the composition control equivalent to that performed by the composition control block 62 illustrated in FIG. 5. When pan control or tilt control is performed as a result of the composition control, the composition control block 74 outputs a control signal for the control to the pan/tilt control block 72.

The pan/tilt control block 72 corresponds to a function to perform a process about pan/tilt control among control processes performed by the control unit 51 illustrated in FIG. 4, and outputs a signal to control the movement of the pan mechanism unit 53 or the tilt mechanism unit 56 to the pan driving unit 55 or the tilt driving unit 58 in response to the control signal input thereto. Accordingly, panning or tilting is performed to obtain the composition determined by the composition control block 62.

As described above, in the imaging system illustrated in FIG. 14, captured image data is transmitted from the digital still camera 1 to the pan/tilt head 10, and a subject detecting process and composition control based on the captured image data are performed on the side of the pan/tilt head 10.

Figure 15:
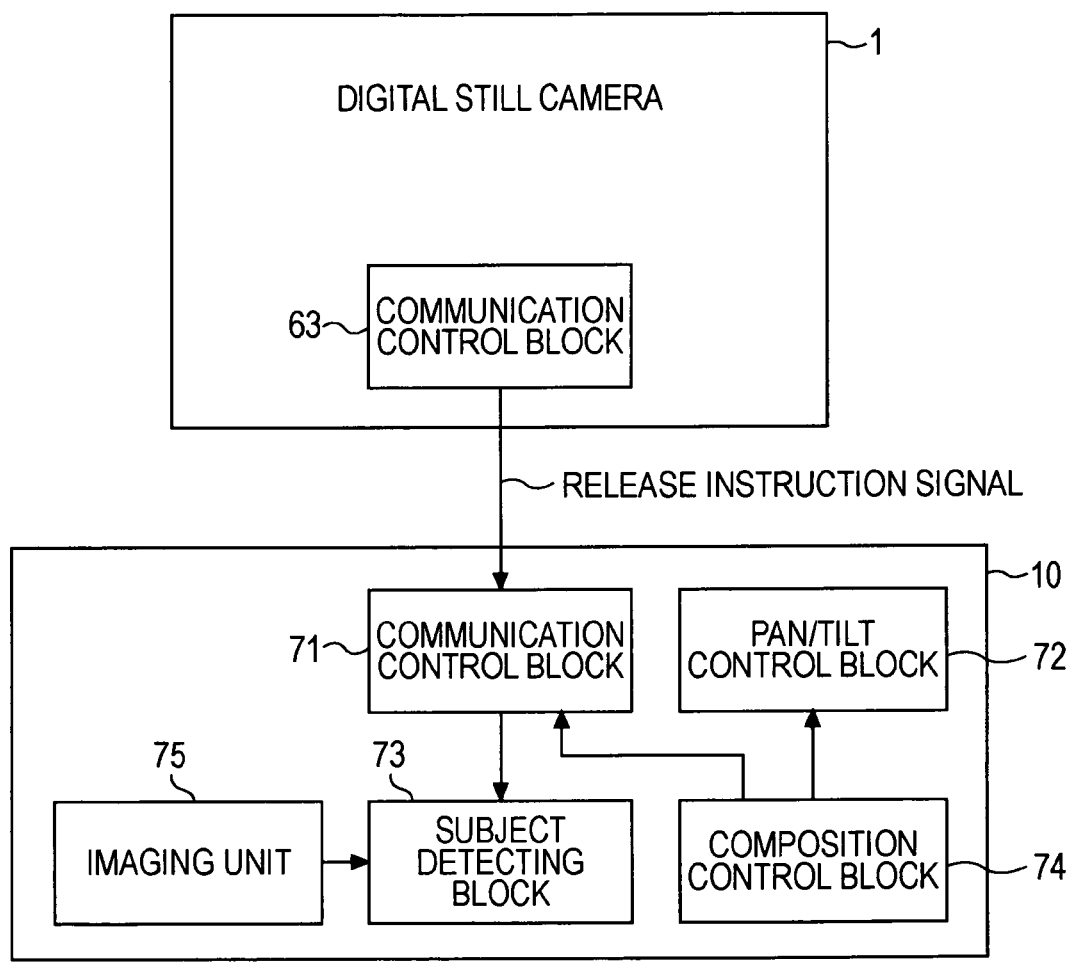
FIG. 15 is a diagram illustrating an example of a configuration as another modification of the imaging system according to the embodiment.

FIG. 15 illustrates an example of a configuration as another modification of the imaging system according to the embodiment. In FIG. 15, parts that are the same as those in FIG. 14 are denoted by the same reference numerals and the corresponding description is omitted.

In this system, an imaging unit 75 is provided in the pan/tilt head 10. The imaging unit 75 includes an optical system and an imaging device (imager) for imaging so as to obtain signals (imaging signals) based on imaging light. Also, the imaging unit 75 includes a signal processing unit to generate captured image data based on the imaging signals. This configuration corresponds to the unit in a signal processing stage for obtaining captured image data, including the optical system unit 21, the image sensor 22, the A/D converter 23, and the signal processing unit 24 illustrated in FIG. 3. The captured image data generated by the imaging unit 75 is output to the subject detecting block 73. Incidentally, the direction in which the imaging unit 75 takes in imaging light (imaging direction) is set so as to be matched as much as possible with the imaging direction of the optical system unit 21 (lens unit 3) of the digital still camera 1 placed on the pan/tilt head 10.

In this case, the subject detecting block 73 and the composition control block 74 perform a subject detecting process and a composition control process in the same manner as that in FIG. 14. However, the composition control block 74 in this case performs pan/tilt control and also allows the communication control block 71 to transmit a release instruction signal to the digital still camera 1 at the timing to perform a release operation. In the digital still camera 1, a release operation is performed upon reception of the release instruction signal.

As described above, in this modification, the entire subject detecting process and composition control except the release operation can be performed on the side of the pan/tilt head 10.

The pan control and tilt control performed in composition control illustrated in FIGS. 11A and 11B and FIGS. 13A and 13B are performed by controlling the movement of the pan/tilt mechanism of the pan/tilt head 10. Alternatively, another configuration may be adopted instead of the pan/tilt head 10. For example, imaging light reflected by a reflective mirror may be allowed to enter the lens unit 3 of the digital still camera 1, and the reflected light may be moved to obtain a panning/tilting result of an image obtained based on the imaging light.

Also, a result equivalent to that of panning/tilting can be obtained by performing control to shift a pixel area to take in imaging signals effective as an image from the image sensor 22 of the digital still camera 1 in the horizontal and vertical directions. In this case, the pan/tilt head 10 or an alternative apparatus for pan/tilt other than the digital still camera 1 is unnecessary, and the entire composition control according to the embodiment can be performed by the digital still camera 1 alone.

Also, panning/tilting can be performed by providing a mechanism capable of changing the optical axis of the lenses in the optical system unit 21 in the horizontal and vertical directions and by controlling the movement of the mechanism.

The configuration for determining a composition based on the embodiment of the present invention can be applied to a system or apparatus other than the imaging system described above as the embodiment. Hereinafter, application examples of composition determination according the embodiment of the present invention are described.

Figure 16:
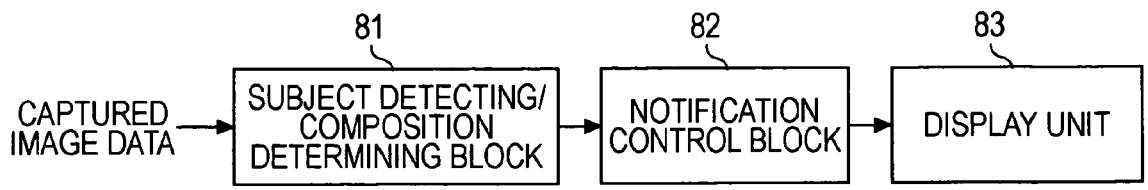
FIG. 16 is a diagram illustrating an application example of composition determination based on the embodiment of the present invention.

First, referring to FIG. 16, the composition determination according to the embodiment of the present invention is applied to a single imaging apparatus, such as a digital still camera. For example, when an appropriate composition of an image being captured by an imaging apparatus is obtained in an imaging mode, a user is notified of this fact through display.

The configuration that should be provided in the imaging apparatus for this purpose includes a subject detecting/composition determining block 81, a notification control block 82, and a display unit 83.

The subject detecting/composition determining block 81 takes in captured image data and performs a subject detecting process equivalent to that performed by the subject detecting block 61 illustrated in FIG. 5 and a composition determining process equivalent to that performed by the composition control block 62 illustrated in FIG. 5 by using detection information as a result of the subject detecting process.

For example, assume that the user holds in hand the imaging apparatus that is set to an imaging mode, and that he/she can record a captured image any time by performing a release operation (shutter button operation).

Under this state, the subject detecting/composition determining block 81 takes in captured image data obtained through imaging at the time and performs subject detection. Then, an optimum composition is specified in accordance with the number of detected individual subjects and so on in a composition control process. Note that, in this composition determining process, the consistency and similarity between the composition of the image content of the captured image data obtained at the time and the optimum composition are determined. If a predetermined degree or more of similarity is obtained, it is determined that the image content of the captured image data that is actually obtained through shooting has the optimum composition. Actually, an algorithm is configured so that a determination of an optimum composition is given if a predetermined degree or more of similarity is obtained and if it is determined that the composition of the image content of the captured image data matches the optimum composition. There are various algorithms to calculate the consistency and similarity, and thus specific examples are not described here.

Information of a determination result indicating that the image content of the captured image data has an optimum composition is output to the notification control block 82. Upon receiving the information, the notification control block 82 performs display control so that a notification indicating that the image currently being captured has an optimum composition to the user is displayed in the display unit 83 in a predetermined manner. The notification control block 82 is realized by a display control function, such as a microcomputer (CPU) included in the imaging apparatus, and a displayed image processing function to realize display of an image in the display unit 83. The notification to the user indicating that an optimum composition is obtained may be performed by using sound, such as electronic sound or synthetic voice.

The display unit 83 corresponds to the display unit 33 of the digital still camera 1 of the embodiment. Typically, a display panel of the display unit is provided in a predetermined position of the imaging apparatus while being exposed, and an image that is currently being captured (so-called through image) is displayed thereon in a shooting mode. Thus, in the actual imaging apparatus, an image notifying the user of an optimum composition is displayed in the display unit 83 while being superimposed on the through image. The user performs a release operation when this notification image appears. Accordingly, even a user who does not have sufficient knowledge and technique of photography can easily take a photo of a good composition.

Figure 17:
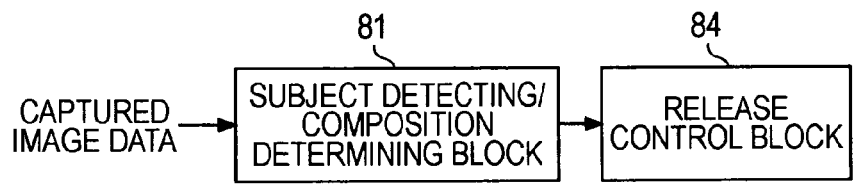
FIG. 17 is a diagram illustrating an application example of composition determination based on the embodiment of the present invention.

FIG. 17 illustrates an example in which the composition determination according to the embodiment of the present invention is applied to a single imaging apparatus, such as a digital still camera, as in FIG. 16.

In the configuration illustrated in FIG. 17, the subject detecting/composition determining block 81 takes in captured image data obtained through imaging at the time and performs a subject detecting process, and also determines whether the image content of the captured image data has an optimum composition based on subject detection information, as in FIG. 16. After determining that the image content has an optimum composition, the subject detecting/composition determining block 81 notifies a release control block 84 of the determination result.

The release control block 84 performs control to record captured image data and is realized by control performed by a microcomputer included in the imaging apparatus, for example. The release control block 84 that has received the notification performs image signal processing and recording control so that the captured image data obtained at the time is stored in a storage medium or the like.

With this configuration, the imaging apparatus can automatically record a captured image when an image of an optimum composition is captured.

The configurations illustrated in FIGS. 16 and 17 can be applied to a digital still camera having the configuration illustrated in FIG. 1 in a category of a still camera. Also, those configurations can be applied to a so-called silver salt camera, which records a captured image on a silver salt film, by providing an image sensor to divide imaging light obtained by an optical system and take in the divided light and a digital image signal processing unit to receive and process signals from the image sensor.

Figure 18:
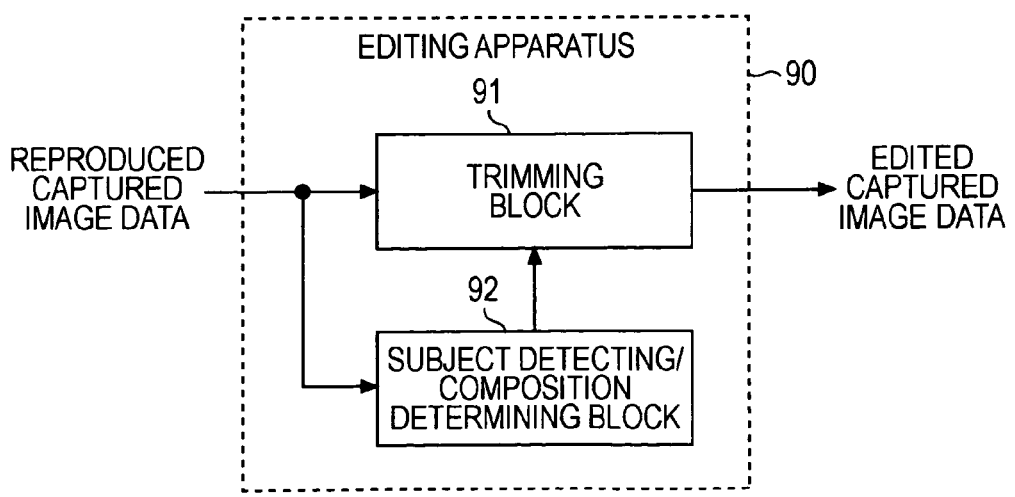
FIG. 18 is a diagram illustrating an application example of composition determination based on the embodiment of the present invention.

FIG. 18 illustrates an example in which the embodiment of the present invention is applied to an editing apparatus to edit existing image data.

FIG. 18 illustrates an editing apparatus 90. The editing apparatus 90 obtains image data from a storage medium through reproducing (reproduced image data) as existing image data. Other than the image data reproduced from the storage medium, image data that is downloaded via a network may be obtained. That is, the path used to obtain captured image data by the editing apparatus 90 is not particularly limited.

The reproduced captured image data obtained by the editing unit 90 is input to each of a trimming block 91 and a subject detecting/composition determining block 92.

First, the subject detecting/composition determining block 92 performs a subject detecting process as in FIGS. 16 and 17 and outputs detection information. Then, as a composition determining process using the detection information, the subject detecting/composition determining block 92 specifies an image portion having a predetermined aspect ratio to obtain an optimum composition (image portion of an optimum composition) in the entire screen as the reproduced captured image data input thereto. Then, after specifying the image portion of the optimum composition, the subject detecting/composition determining block 92 outputs information indicating the position of the image portion (trimming instruction information) to the trimming block 91.

In response to the input of the trimming instruction information, the trimming block 91 performs image processing to extract the image portion indicated by the trimming instruction information from the reproduced captured image data input thereto and outputs the extracted image portion as independent image data. This is edited captured image data.

With this configuration, trimming of newly obtaining image data by extracting a portion of an optimum composition from the image content of original image data is automatically performed as an editing process of image data. Such an editing function may be adopted as an application to edit image data installed into a personal computer or the like or as an image editing function in an application to manage image data.

Figure 19:
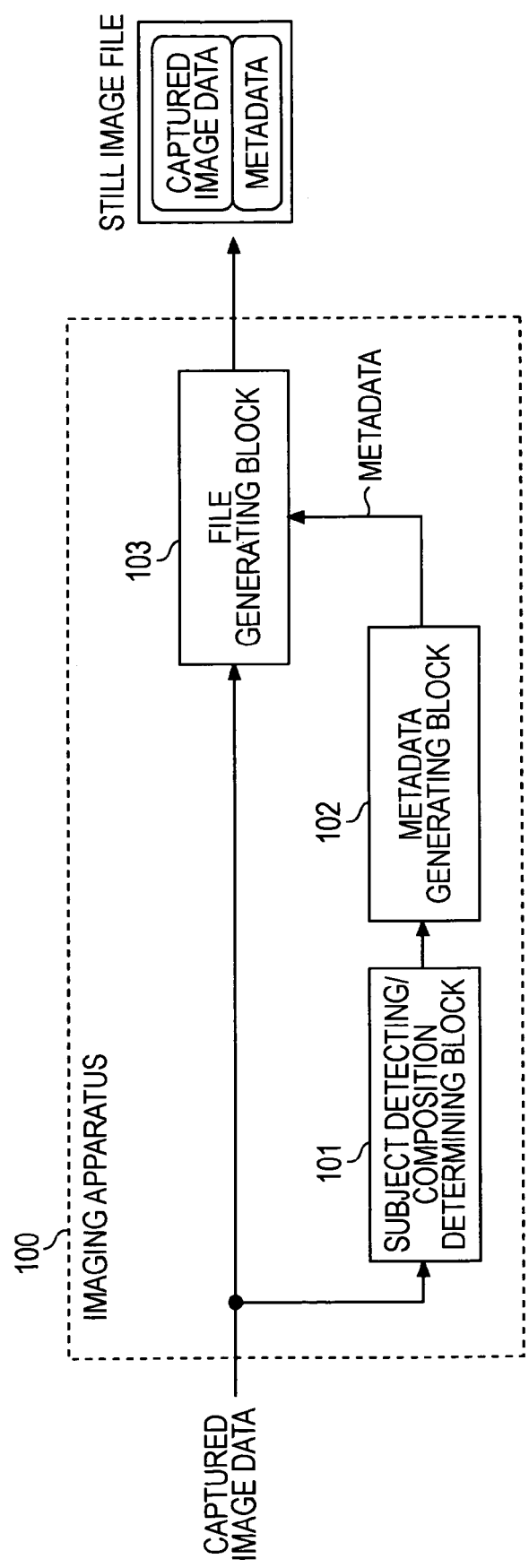
FIG. 19 is a diagram illustrating an application example of composition determination based on the embodiment of the present invention.

FIG. 19 is an example of a configuration in which the composition determination according to the embodiment of the present invention is applied to an imaging apparatus, such as a digital still camera.

Captured image data obtained through imaging by an imaging unit (not illustrated) is input to a subject detecting/composition determining block 101 and a file generating block 103 in an imaging apparatus 100. In this case, the captured image data input to the imaging apparatus 100 is captured image data that should be stored in a storage medium by a release operation or the like and is generated based on imaging signals obtained through imaging by the imaging unit (not illustrated).

First, the subject detecting/composition determining block 101 performs subject detection on the captured image data input thereto and determines an optimum composition based on detection information. Specifically, as in the case illustrated in FIG. 18, information specifying an image portion of an optimum composition in the entire screen of the input captured image data may be obtained. Then, the subject detecting/composition determining block 101 outputs information indicating a determination result of the optimum composition obtained in this way to a metadata generating block 102.

The metadata generating block 102 generates metadata (composition editing metadata) including information necessary to obtain an optimum composition from the corresponding captured image data based on the input information and outputs the metadata to the file generating block 103. The composition editing metadata includes, for example, position information that can indicate an image area portion on which trimming is to be performed in the screen as the corresponding captured image data.

In the imaging apparatus 100 illustrated in FIG. 19, captured image data is recorded on a storage medium so that the data is managed as a still image file of a predetermined format. For this purpose, the file generating block 103 converts captured image data to a still image file format (generates a still image file).

First, the file generating block 103 performs image compression coding corresponding to the image file format on the captured image data input thereto, so as to generate a file main body composed of captured image data. Also, the file generating block 103 generates a header and a data portion including an additional information block while storing the composition editing metadata received from the metadata generating block 102 in a predetermined storage position. Then, the file generating block 103 generates a still image file based on the file main body, header, and additional information block and outputs the still image file. Accordingly, the still image file that should be recorded on a storage medium and that has a configuration including the captured image data and the metadata (composition editing metadata) can be obtained as illustrated in FIG. 19.

Figure 20:
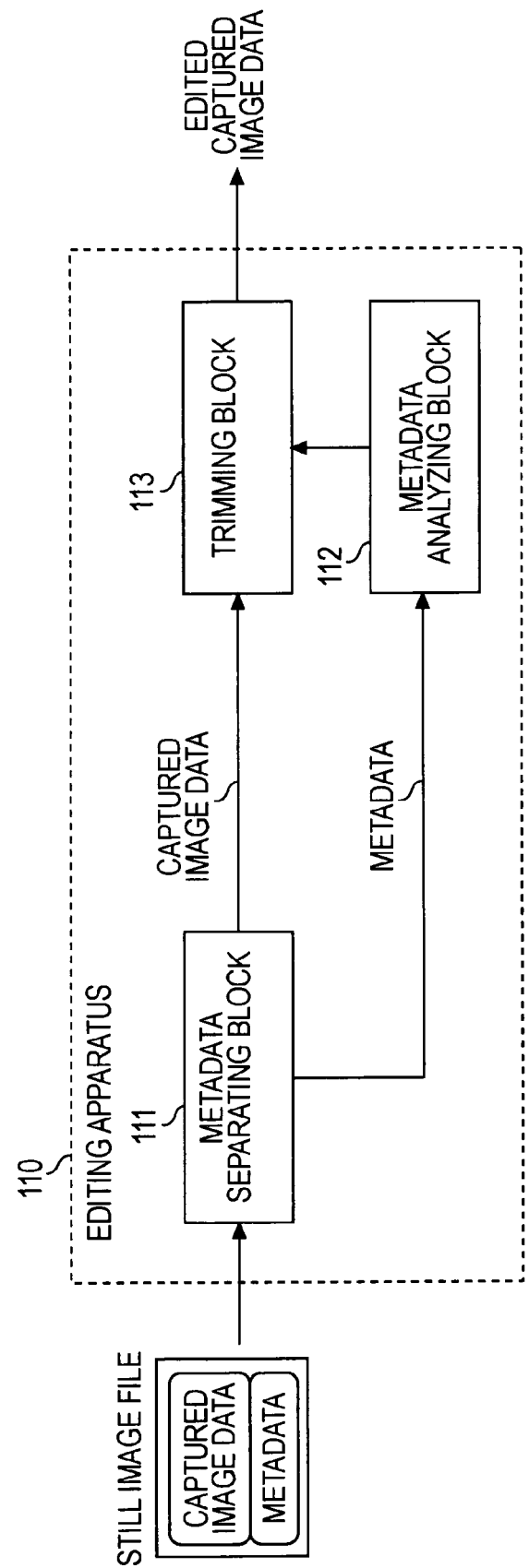
FIG. 20 is a diagram illustrating an application example of composition determination based on the embodiment of the present invention.

FIG. 20 illustrates an example of a configuration of an editing apparatus to edit a still image file generated by the apparatus illustrated in FIG. 19.

The editing apparatus 110 illustrated in FIG. 20 takes in data of a still image file and inputs the data to a metadata separating block 111. The metadata separating block 111 separates captured image data corresponding to a file main body from metadata in the data of the still image file. The metadata obtained thorough separation is output to a metadata analyzing block 112, whereas the captured image data is output to a trimming block 113.

The metadata analyzing block 112 analyzes the obtained metadata. As an analyzing process, the metadata analyzing block 112 specifies at least an image area on which trimming should be performed in the corresponding captured image data with reference to information to obtain an optimum composition included in the composition editing metadata. Then, the metadata analyzing block 112 outputs trimming instruction information to provide instructions to perform trimming of the specified image area to the trimming block 113.

As the trimming block 91 illustrated in FIG. 18, the trimming block 113 performs image processing to extract the image portion indicated by the trimming instruction information input from the metadata analyzing block 112 from the captured image data input from the metadata separating block 111, and outputs the extracted image portion as edited captured image data, which is independent image data.

According to the system including the imaging apparatus and the editing apparatus illustrated in FIGS. 19 and 20, edit of extracting an image of an optimum composition from original still image data by using metadata can be performed while storing the original still image data obtained by shooting (captured image data) in an unprocessed state. In addition, the image portion to be extracted corresponding to the optimum composition is automatically decided.

Figure 21:
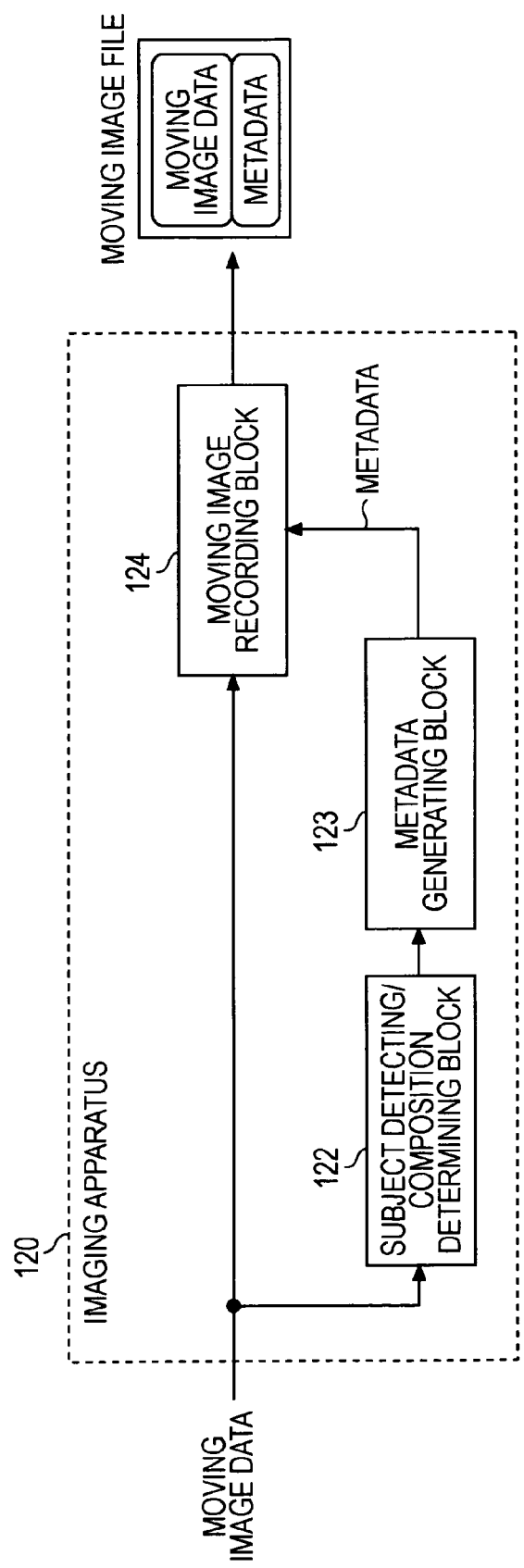
FIG. 21 is a diagram illustrating an application example of composition determination based on the embodiment of the present invention.

FIG. 21 illustrates an example in which the embodiment of the present invention is applied to an imaging apparatus capable of capturing and recording moving images, such as a video camera.

Moving image data is input to an imaging apparatus 120 illustrated in FIG. 21. The moving image data is generated based on imaging signals obtained through imaging by an imaging unit included in the imaging apparatus 120. The moving image data is input to a subject detecting/composition determining block 122 and a moving image recording block 124 in the imaging apparatus 120.

The subject detecting/composition determining block 122 in this case determines whether a composition of moving image data input thereto is good or unfavorable. For example, the subject detecting/composition determining block 122 holds parameters (good composition corresponding parameters) defining a good composition. The parameters include a target subject size and a horizontal offset amount θx that are set as appropriate in accordance with information of the number of detected individual subjects and the face orientation of each individual subject. The subject detecting/composition determining block 122 continuously performs composition determination on moving image data input thereto (for example, calculates composition parameters, such as the occupancy of actual individual subjects in the moving image data and a distance K between the subjects) and compares the composition parameters of the moving image data obtained as a determination result with the above-described good composition corresponding parameters. If the composition parameters of the moving image data have a predetermined degree or more of similarity with respect to the good composition corresponding parameters, it is determined that the moving image data has a good composition. Otherwise, it is determined that the moving image data has an unfavorable composition.

If the subject detecting/composition determining block 122 determines that the moving image data has a good composition, it outputs information indicating an image section that has been determined to have a good composition (good composition image section) in the moving image data (good composition image section indicating information) to the metadata generating block 123. The good composition image section indicating information is information indicating a start position and an end position of the good composition image section in the moving image data, for example.

The metadata generating block 123 in this case generates various necessary metadata about moving image data to be recorded as a file on a storage medium by the moving image recording block 124 described below. When receiving good composition image section indicating information from the subject detecting/composition determining block 122 in the above-described manner, the metadata generating block 123 generates metadata indicating that the image section indicated by the input good composition image section indicating information has a good composition, and outputs the metadata to the moving image recording block 124.

The moving image recording block 124 performs control to record the input moving image data on a storage medium so that the moving image data is managed as a moving image file of a predetermined format. When metadata is output from the metadata generating block 123, the moving image recording block 124 performs control so that the metadata is recorded while being included in metadata attached to the moving image file.

Accordingly, as illustrated in FIG. 21, the moving image file recorded on a storage medium includes moving image data obtained through imaging and metadata indicating the image section having a good composition, the metadata being attached to the moving image data.

The image section having a good composition indicated by metadata in the above-described manner may be an image section of a moving image having a certain time width or may be a still image extracted from moving image data. Alternatively, moving image data or still image data of an image section having a good composition may be generated instead of the above-described metadata, and the generated data may be recorded as side still image data added to the moving image file (or as a file independent of the moving image file).

Furthermore, in the configuration illustrated in FIG. 21 where the imaging apparatus 120 includes the subject detecting/composition determining block 122, only a section of a moving image determined to be a good composition image section by the subject detecting/composition determining block 122 may be recorded as a moving image file. Furthermore, image data corresponding to an image section determined to be a good composition by the subject detecting/composition determining block 122 may be output to an external apparatus via a data interface or the like.

Figure 22:
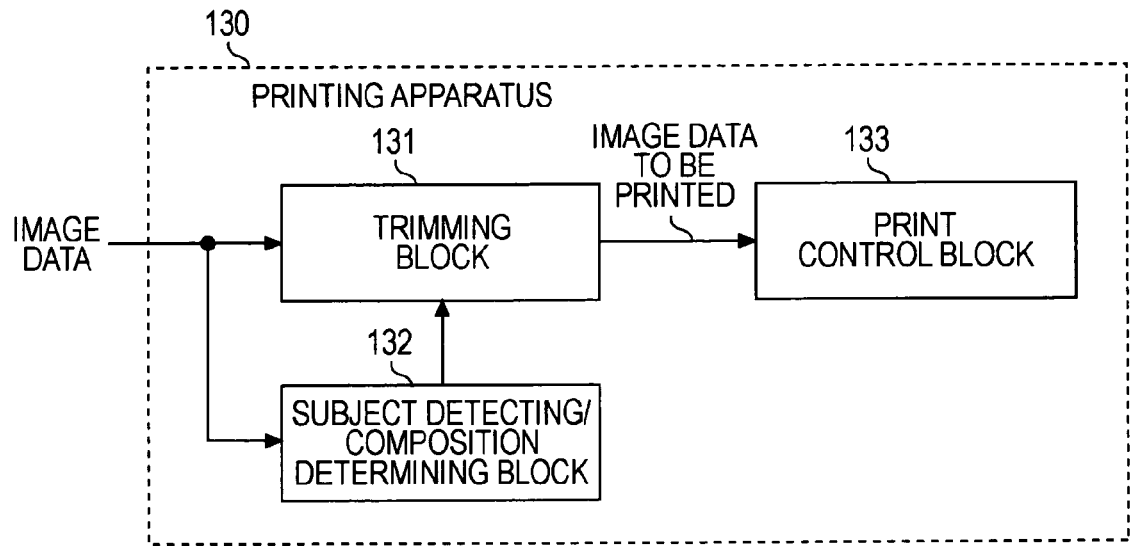
FIG. 22 is a diagram illustrating an application example of composition determination based on the embodiment of the present invention.

FIG. 22 illustrates an example in which the embodiment of the present invention is applied to a printing apparatus to perform printing.

In this case, a printing apparatus 130 takes in image data (still image) having image content to be printed. The data that has been taken in is input to a trimming block 131 and a subject detecting/composition determining block 132.

First, the subject detecting/composition determining block 132 performs the subject detecting/composition determining process same as that performed by the subject detecting/composition determining block 92 illustrated in FIG. 18, so as to specify an image portion of an optimum composition in the entire screen of the input image data, generates trimming instruction information according to a processing result, and outputs the information to the trimming block 131.

The trimming block 131 performs image processing to extract the image portion indicated by the trimming instruction information from the input image data in the same manner as in the trimming block 91 illustrated in FIG. 18. Then, the trimming block 131 outputs the data of the extracted image portion to a print control block 133 as image data to be printed.

The print control block 133 performs control to operate a printing mechanism (not illustrated) by using the input image data to be printed.

With this operation, in the printing apparatus 130, an image portion having an optimum composition is automatically extracted from the image content of the input image data and is printed on a sheet.

Figure 23:
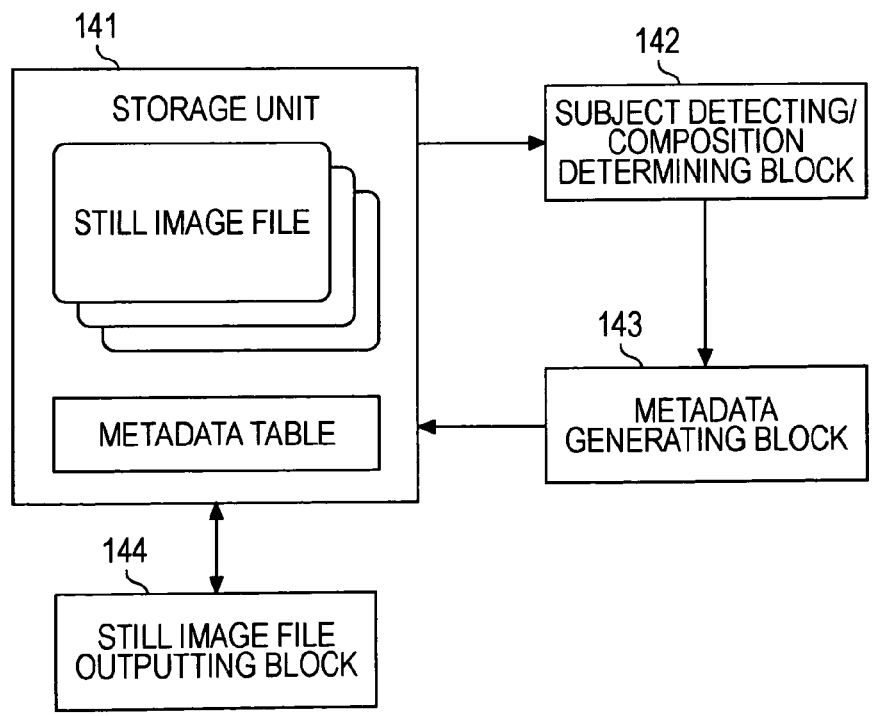
FIG. 23 is a diagram illustrating an application example of composition determination based on the embodiment of the present invention.

The example illustrated in FIG. 23 is preferably applied to an apparatus or system to store many still image files and provide a service using the still image files.

Many still image files are stored in a storage unit 141.

A subject detecting/composition determining block 142 takes in a still image file stored in the storage unit 141 at predetermined timing and extracts still image data stored in the file main body thereof. Then, the subject detecting/composition determining block 142 performs the process same as that performed by the subject detecting/composition determining block 101 illustrated in FIG. 19 on the still image data so as to obtain information indicating a determination result about an optimum composition, and then outputs the information to a metadata generating block 143.

The metadata generating block 143 generates metadata (composition editing metadata) based on the input information, as the metadata generating block 102 illustrated in FIG. 19. Then, in this case, the metadata generating block 143 registers the generated metadata in a metadata table stored in the storage unit 141. The metadata table is an information unit to store metadata such that the correspondence with the still image data stored in the storage unit 141 is indicated. That is, the metadata table indicates the correspondence between metadata (composition editing metadata) and the still image file as a target of a subject detecting process and a composition determining process to generate the metadata performed by the subject detecting/composition determining block 142.

When a still image file stored in the storage unit 141 is to be output in response to a request for the still image file from the outside (in a server, for example, a still image file is downloaded in response to a download request from a client), a still image file outputting block 144 searches the storage unit 141 for the requested still image file and takes in the file, and also searches the metadata table for the metadata (composition editing metadata) corresponding to the searched still image file and takes in the metadata.

The still image file outputting block 144 includes at least functional blocks corresponding to the metadata analyzing block 112 and the trimming block 113 illustrated in FIG. 20.

In the still image file outputting block 144, the metadata analyzing block provided therein analyzes the taken metadata so as to obtain trimming instruction information. Then, the trimming block provided therein performs trimming on the still image data stored in the taken still image file in accordance with the trimming instruction information. Then, the still image file outputting block 144 generates new still image data based on the image portion obtained through the trimming and outputs the new still image data.

The system configuration illustrated in FIG. 23 can be applied to various services.

For example, the system configuration can be applied to a photo print service via a network. Specifically, a user uploads image data (still image file) to be printed to a server of a print service via a network. In the server, the uploaded still image file is stored in the storage unit 141, and metadata corresponding to the file is generated and is registered in the metadata table. Then, at actual print output, the still image file outputting block 144 outputs still image data generated by extracting an optimum composition as image data to be printed. That is, in this service, a printed image in which a composition is corrected to an optimum composition is transmitted in response to a request for photo print.

Also, the system configuration can be applied to a server of a blog or the like. Text data of a blog and uploaded image data are stored in the storage unit 141. Accordingly, an image of an optimum composition can be extracted from the image data uploaded by the user and the extracted image can be pasted on a page of the blog.

The configurations described above with reference to FIGS. 14 to 23 are only examples, and the composition determination according to the embodiment of the present invention can be applied to other apparatuses, systems, and application software.

The description of the embodiment given above is based on the assumption that the subject (individual subject) is a person, but the embodiment of the present invention can also be applied to the case where the subject is an animal.

Also, image data as a target of subject detection should not be limited to data obtained through imaging (captured image data). For example, image data having image content of paintings or design drawings may be used.

The composition determined based on the embodiment of the present invention (optimum composition) is not necessarily limited to a composition that is decided by a composition setting method, such as the rule of thirds, to which an element of the number of detected individual subjects is added. For example, even a composition that is generally regarded as unfavorable would be evaluated by a user as an interesting or good composition, depending on setting of the composition. Therefore, as the composition determined based on the embodiment of the present invention (optimum composition), a composition may be arbitrarily set in view of practicality and an entertainment characteristic, and there is no particular limit in practice.

It should be understood by those skilled in the art that various modifications, combinations, sub-combinations and alterations may occur depending on design requirements and other factors insofar as they are within the scope of the appended claims or the equivalents thereof.

What is claimed is:

1. A composition determining apparatus, comprising:
   subject detecting means for detecting one or more specific subjects in an image based on image data;
   subject orientation detecting means for detecting subject orientation information indicating an orientation in the image of the subject detected by the subject detecting means, the detection of the subject orientation information being performed for each of the detected subjects; and
   composition determining means for determining a composition based on the subject orientation information,
   wherein in response to a plurality of subjects being detected by the subject detecting means, the composition determining means determines a composition based on a relationship among a plurality of pieces of the subject orientation information corresponding to the plurality of subjects, and in response to the plurality of pieces of subject orientation information indicating that each of the plurality of subjects has the same orientation, the composition determining means obtains, as a determination result, a composition in which a barycenter of an image portion composed of all of the detected subjects in the image is displaced a predetermined distance from an image area dividing line in a direction opposite to a direction of the orientation of the plurality of subjects.

2. The composition determining apparatus according to claim 1, wherein the composition determining means sets the predetermined distance between the image area dividing line and the barycenter based on the number of the detected subjects.

3. The composition determining apparatus according to claim 1, wherein in response to the plurality of pieces of subject orientation information indicating that the plurality of subjects do not all have are the same orientation, the composition determining means obtains, as the determination result, a composition in which at least the barycenter of the image portion composed of all of the plurality of detected subjects is positioned at the image area dividing line.

4. The composition determining apparatus according to claim 3, wherein in response to a group formed of the largest number of pieces of subject orientation information indicating that the number of subjects having the same orientation does not account for a predetermined percentage or more of all of the plurality of subjects, the composition determining means determines, as an optimum composition, a composition in which the barycenter the image portion composed of all the detected subjects in the image is positioned at the image area dividing line.

5. The composition determining apparatus according to claim 3, wherein in response to a group formed of the largest number of pieces of subject orientation information indicating that the number of subjects having the same orientation accounts for the predetermined percentage or more of all of the plurality of subjects, the composition determining means obtains, as the determination result, a composition in which the barycenter of the image portion composed of all the detected subjects in the image is displaced a predetermined distance from the image area dividing line in a direction opposite to a direction of the orientation of the largest number of subjects.

6. The composition determining apparatus according to claim 5, wherein the composition determining means sets the predetermined distance between the image area dividing line and the barycenter based on the number of the detected subjects.

7. A composition determining method, comprising:

detecting one or more specific subjects in an image based on image data;

detecting subject orientation information indicating an orientation in the image of the subject detected in the subject detecting step, the detection of the subject orientation information being performed for each of the detected subjects; and determining a composition based on the subject orientation information, wherein in response to a plurality of subjects being detected in the subject detecting step, the determining step determines a composition based on a relationship among a plurality of pieces of the subject orientation information corresponding to a plurality of subjects, and in response to the plurality of pieces of subject orientation information indicating that each of the plurality of subjects has the same orientation, obtaining, as a determination result, a composition in which a barycenter of an image portion composed of all of the detected subjects in the image is displaced a predetermined distance from an image area dividing line in a direction opposite to a direction of the orientation of the plurality of subjects.

8. A processor encoded with a computer program for carrying out a composition determining method, the method comprising:

detecting one or more specific subjects in an image based on image data;

detecting subject orientation information indicating an orientation in the image of the subject detected in the subject detecting step, the detection of the subject orientation information being performed for each of the detected subjects; and determining a composition based on the subject orientation information, wherein in response to a plurality of subjects being detected in the subject detecting step, the determining step determines a composition based on a relationship among a plurality of pieces of the subject orientation information corresponding to a plurality of subjects, and in response to the plurality of pieces of subject orientation information indicating that each of the plurality of subjects has the same orientation, obtaining, as a determination result, a composition in which a barycenter of an image portion composed of all of the detected subjects in the image is displaced a predetermined distance from an image area dividing line in a direction opposite to a direction of the orientation of the plurality of subjects.

9. A composition determining apparatus, comprising:

a subject detecting unit configured to detect one or more specific subjects in an image based on image data;

a subject orientation detecting unit configured to detect subject orientation information indicating an orientation in the image of the subject detected by the subject detecting unit, the detection of the subject orientation information being performed for each of the detected subjects; and a composition determining unit configured to determine a composition based on the subject orientation information, wherein in response to a plurality of subjects being detected by the subject detecting unit, the composition determining unit determines a composition based on a relationship among a plurality of pieces of the subject orientation information corresponding to the plurality of subjects, and in response to the plurality of pieces of subject orientation information indicating that each of the plurality of subjects has the same orientation, the composition determining unit obtains, as a determination result, a composition in which a barycenter of an image portion composed of all of the detected subjects in the image is displaced a predetermined distance from an image area dividing line in a direction opposite to a direction of the orientation of the plurality of subjects.

* * * * *